US012013883B1

United States Patent
Shukla et al.

(10) Patent No.: US 12,013,883 B1
(45) Date of Patent: Jun. 18, 2024

(54) CROSS VIEW TEMPLATE RECOMMENDATION SYSTEM

(71) Applicant: Adobe Inc., San Jose, CA (US)

(72) Inventors: Tripti Shukla, Uttar Pradesh (IN);
Vishwa Vinay, Bangalore (IN);
Srikrishna Karanam, Bangalore (IN);
Praneetha Vaddamanu, Pittsburgh, PA (US); Balaji Vasan Srinivasan, Bangalore (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/200,856

(22) Filed: May 23, 2023

(51) Int. Cl.
*G06F 3/0484* (2022.01)
*G06F 16/31* (2019.01)
*G06F 16/332* (2019.01)
*G06F 40/106* (2020.01)
*G06F 40/109* (2020.01)
*G06F 40/186* (2020.01)

(52) U.S. Cl.
CPC .......... *G06F 16/3323* (2019.01); *G06F 16/31* (2019.01); *G06F 40/106* (2020.01); *G06F 40/109* (2020.01); *G06F 40/186* (2020.01)

(58) Field of Classification Search
CPC .... G06F 16/3323; G06F 16/31; G06F 40/106; G06F 40/109; G06F 40/186
See application file for complete search history.

(56) References Cited

U.S. PATENT DOCUMENTS

| | | | |
|---|---|---|---|
| 7,055,094 B2 * | 5/2006 | Imielinski | G06F 40/143 715/239 |
| 8,521,757 B1 * | 8/2013 | Nanda | G06N 20/00 706/15 |

(Continued)

OTHER PUBLICATIONS

Benesty, et al., Pearson Correlation Coefficient in Noise Reduction in Speech Processing, Springer Topics in Signal Processing, vol. 2, online Jan. 1, 2009, 12 pages.

(Continued)

*Primary Examiner* — Hassan Mrabi
(74) *Attorney, Agent, or Firm* — Kilpatrick Townsend & Stockton LLP

(57) ABSTRACT

An illustrator system determines, for each feature of a set of features, a feature representation for an electronic document displayed via a user interface, based on a plurality of elements of the electronic document. The system receives a selection from among the set of features of (1) a query feature and of (2) a target feature and determines, for each replacement template of a set of replacement templates, a compatibility score based on the feature representation for the electronic document determined for the query feature and a target feature representation of the replacement template determined for the target feature, the representations being determined in a joint representation space. The system selects one or more replacement electronic documents based on the determined compatibility scores. The system displays a preview for each replacement electronic document and (Continued)

displays a particular replacement electronic document responsive to receiving a selection of a preview.

18 Claims, 9 Drawing Sheets
(2 of 9 Drawing Sheet(s) Filed in Color)

(56) References Cited

U.S. PATENT DOCUMENTS

| | | | | |
|---|---|---|---|---|
| 11,763,075 | B1* | 9/2023 | Sarrafzadeh | G06F 40/12 715/235 |
| 2014/0089789 | A1* | 3/2014 | Schowtka | G06F 40/186 715/243 |
| 2014/0282138 | A1* | 9/2014 | Hopton | G06F 9/451 715/765 |
| 2017/0255597 | A1* | 9/2017 | Sinn | G06F 3/04842 |
| 2017/0308517 | A1* | 10/2017 | Josifovski | G06Q 10/10 |
| 2020/0134007 | A1* | 4/2020 | Swider | G06F 16/5846 |
| 2020/0356891 | A1* | 11/2020 | Saito | G06N 5/045 |
| 2021/0256216 | A1* | 8/2021 | Downs | G06F 40/186 |
| 2022/0027615 | A1* | 1/2022 | Borhanazad | G06V 30/412 |
| 2023/0136200 | A1* | 5/2023 | Chism | G06Q 10/10 705/342 |
| 2023/0237251 | A1* | 7/2023 | Brdiczka | G06F 40/12 715/256 |
| 2023/0334309 | A1* | 10/2023 | Streltsov | G06F 40/186 |

OTHER PUBLICATIONS

Li, et al., A Survey of Multi-View Representation Learning, IEEE Transactions on Knowledge and Data Engineering, vol. 31, No. 10, Sep. 23, 2018, arXiv:1610.01206v5, Oct. 24, 2018, pp. 1-20.

Schaeffer, et al. Concerning Kendall's Tau, A Nonparametric Correlation Coefficient, Psychological Bulletin, vol. 53, No. 4, Jul. 1956, pp. 338-346, Abstract, 1 page.

Smeulders, et al.Content-Based Image Retrieval at the End of the Early Years, IEEE Transactions on Pattern Analysis and Machine Intelligence, vol. 22, No. 12, Dec. 2000, pp. 1349-1380.

Zhao, et al., Multi-View Learning Overview: Recent Progress and New Challenges, Information Fusion, vol. 38, 2017, preprint Feb. 14, 2017, pp. 1-52.

Create a Website without Limits, Website Builder—Create a Free Website Today, Available Online at: https://www.wix.com/, Accessed from Internet on May 12, 2023, 12 pages.

Easily Present Attractive Slides, WPS Office Presentation, Available Online at: https://www.wps.com/office/presentation/, Accessed from Internet on May 12, 2023, 4 pages.

Make a Free Project with Adobe Express, Adobe Express, Free Online Photo & Design Tool, Available Online at: https://www.adobe.com/express/, Accessed from Internet on May 12, 2023, 9 pages.

Power Point, Microsoft Powerpoint, Available Online at: https://www.office.com/launch/powerpointui=enUS&rs=US&auth=2, 1 page.

Upgrade your Website to the Latest Trends, Let Artificial Intelligence Upgrade Your Website, Available Online at: https://ukit.ai/en, 2017-2023, 3 pages.

Watch TV Shows Online, Watch Movies Online, Netflix India, Available Online at: https://www.netflix.com/, Accessed from Internet on May 12, 2023, 4 pages.

Devlin, et al., BERT: Pre-training of Deep Bidirectional Transformers for Language Understanding, Available Online at: https://arxiv.org/pdf/1810.04805.pdf, May 24, 2019, 16 pages.

Hazarika, et al., MISA: Modality-Invariant and -Specific Representations for Multimodal Sentiment Analysis, Oral Session D3: Multimodal Fusion and Embedding, MM '20: Proceedings of the 28th ACM International Conference on Multimedia, Oct. 12-16, 2020, pp. 1122-1131.

He, et al. Deep Residual Learning for Image Recognition, IEEE Conference on Computer Vision and Pattern Recognition (CVPR), Jun. 27-30, 2016, pp. 770-778.

Ishikawa, et al., MindReader: Querying Databases Through Multiple Examples VLDB '98: Proceedings of the 24rd International Conference on Very Large Data Basespp. 218-227, Aug. 1998.

Ruta, et al., ALADIN: All Layer Adaptive Instance Normalization for Fine-Grained Style Similarity, In Proceedings of the International Conference on Computer Vision (ICCV), Mar. 17, 2021, 10 pages.

Smith, et al., VisualSEEK: a Fully Automated Content-based Image Query System, Multimedia '96: Proceedings of the fourth ACM international conference on Multimedia, Feb. 1, 1997, pp. 87-98.

Tan, et al., LXMERT: Learning Cross-Modality Encoder Representations from Transformers, Available Online at: https://arxiv.org/pdf/1908.07490.pdf, Dec. 3, 2019, 14 pages.

Tsai, et al., Learning Factorized Multimodal Representations, International Conference on Learning Representations (ICLR), May 14, 2019, 20 pages.

Turgutlu, et al., LayoutBERT: Masked Language Layout Model for Object Insertion, Available Online at: https://arxiv.org/pdf/2205.00347.pdf, Apr. 30, 2022, 15 pages.

Van Der Maaten, et al., Visualizing Data Using t-SNE, Journal of Machine Learning Research, vol. 9, No. 11, Nov. 2008, pp. 2579-2605.

Vempati, et al., Enabling Hyper-Personalisation: Automated Ad Creative Generation and Ranking for Fashion e-Commerce, In Fashion Recommender Systems, Nov. 5, 2020, pp. 25-48.

Vo, et al. Composing Text and Image for Image Retrieval—An Empirical Odyssey, In Proceedings of the IEEE/CVF Conference on Computer Vision and Pattern Recognition (CVPR), 2019, pp. 6439-6448.

Ying, Flipboard's Duplo, Available Online at: https://engineering.flipboard.com/2014/03/web-layouts, Mar. 24, 2014, 21 pages.

Zbontar, et al., Barlow Twins: Self-Supervised Learning via Redundancy Reduction, In Proceedings of the 38th International Conference on Machine Learning, Virtual Event, Proceedings of Machine Learning Research, vol. 139, Jul. 18-24, 2021, 11 pages.

* cited by examiner

Template 614
(e.g. template 114)      Query 117                          Conventional Query 601
                                                            LAB Histogram→LAB Histogram
Object→Color
117-1  117-2

Previews 115                                 Previews 602
(based on query 117)              (based on conventional query 601)

k = 50

605                                          615 k = 200

610                                          620

CROSS VIEW TEMPLATE RECOMMENDATION SYSTEM

TECHNICAL FIELD

This disclosure generally relates to suggesting editing operations for composite or layered documents. More specifically, but not by way of limitation, this disclosure relates to systems for generation and suggestion of replacement composite documents.

BACKGROUND

Conventional document editing systems can suggest one or more formatting or editing operations to apply to a composite document and display the suggested editing operations in a user interface.

SUMMARY

The present disclosure describes techniques for using an illustrator system to generate previews of suggested replacement templates having designs that are semantically similar to content in a displayed template, according to certain embodiments disclosed herein. For example, an illustrator system. An illustrator system determines, for each feature of a set of features, a feature representation for an electronic document displayed via a user interface. The electronic document includes a plurality of elements. The feature representation is determined based on the plurality of elements. The illustrator system receives, via the user interface, a selection from among the set of features of (1) a query feature and of (2) a target feature. The illustrator system determines, for each replacement template of a set of replacement templates, a compatibility score based on a query feature representation including the feature representation for the electronic document determined for the query feature and a target feature representation of the replacement template determined for the target feature. The query feature representation and the target feature representation are determined in a joint representation space. The illustrator system selects one or more replacement electronic documents based on the determined compatibility scores. The illustrator system displays, via the user interface with the electronic document, a preview for each replacement electronic document of the one or more replacement electronic documents. Responsive to receiving, via the user interface, a selection of a particular preview from the displayed one or more previews, the illustrator system displays, via the user interface, a particular replacement electronic document associated with the selected particular preview instead of the electronic document.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
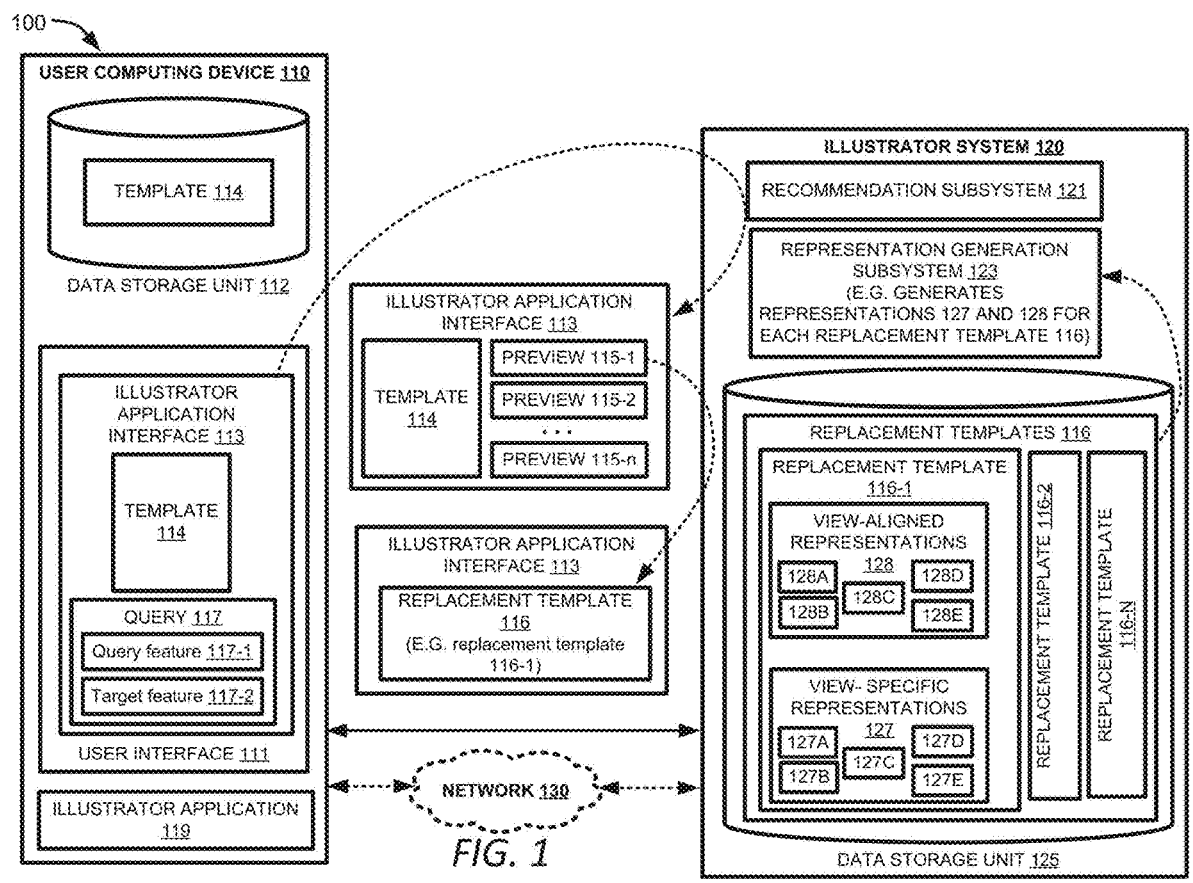
FIG. 1 depicts an example of a computing environment for generating previews of suggested replacement templates that are similar, over a selected target feature, to a selected query feature of a displayed template, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Certain embodiments described herein address the limitations of conventional systems by providing a system to generate, for a displayed template, previews of suggested replacement templates that are aligned across different features, wherein the preview can be used for modifying online computing environments or other systems. Examples of features (e.g., views, semantics, design aspects) include a color feature, a text feature, a style feature, an object type feature, and a layout feature. For example, a preview provides a visual indication of a replacement template and, responsive to selection of the preview, the system can replace the displayed template with the replacement template associated with the selected preview. In some instances, a template is a multi-element document, for example, a multi-element canvas including one or more of a background element, image elements, shape elements, custom generated elements, or text elements. In some instances, the template is a multi-element document including multiple layers. Certain embodiments described herein improve the performance of conventional illustrator systems by, for example, indexing a set of templates using feature representations for each feature of a set of features. The feature representations are aligned because they are represented in a joint feature space. Indexing templates using the aligned feature representations as described herein improves an accuracy of recommendations of replacement templates by enabling the retrieval, using the indexing, of replacement templates having a second feature (e.g., a target feature) that is most aligned with a first feature (e.g., a query feature) of a currently displayed template. By using the aligned representation indexing of templates described herein, users are able to search for replacement templates for a currently displayed template without having to enter keywords, which results in a search user interface that is easier to navigate than conventional keyword-based search interfaces. Further, by indexing replacement templates with feature-aligned representations, the embodiments described herein improve a performance of template recommendations by capturing a co-occurrence of specific features in templates.

Further, certain embodiments described herein improve the performance and/or usability of user interfaces by, for example, providing a suggestive editing interface which reduces a number of inputs required to perform editing operations. For example, in some instances, the embodiments described herein provide previews of replacement templates which, upon selection by the user, replace the template with the replacement template without requiring multiple user interface inputs to edit the template to correspond to the replacement template. For example, the template may comprise a blue background, a text in a first font, and a first object and the replacement template comprises a green background, the text in a second font, and a second object. In this example, instead of the user having to manually change the background color, manually change the text font, and manually delete the first object and add the second object via multiple user interface operations, these editing operations are suggested to the user in the preview object described in the embodiments herein. In this example, a single selection of the preview object causes the multiple suggested editing operations to be effected, which simplifies the user interface experience by reducing the number of inputs required to perform the multiple editing operations.

The following non-limiting example is provided to introduce certain embodiments. In certain embodiments, the illustrator system accesses a template including one or more elements displayed via a user interface. For example, the elements can include a background element, text elements (e.g., extracted text, a text box, a text layer, or other text element), image elements (e.g., an image layer, an image object, a region of a multi-element document) or other elements that are laid out by the user of an illustrator application interface. The elements can, in some instances, include video elements, audio, or other multimedia elements. In some instances, the elements are layered. For example, the user accesses the illustrator application interface via a user interface of a user computing device and generates the template by choosing a solid color background and adding elements including an image element of a cast iron pan layered on top of the background element, and adding a text element entitled "Campfire cooking" also layered on top of the background element.

The illustrator system determines, for each feature of a set of features, a respective feature representation based on the one or more elements of the template. For example, the user wants to receive suggestions for replacement templates to aid the user in designing a final template based on his or her initial template. The set of features, in certain embodiments described herein, include object features, layout features, color features, style features, and text features. Object features include types of objects represented by the elements of the document, for example, dog objects, car objects, or other type(s) of objects in the document. Layout features include a way that elements (e.g., background, text, image elements) are arranged in the template. Color features include a color distribution of elements in the document or a color distribution of pixels of an image of the document. For example, template may only include elements having various shades of green, include only black/white/grey elements, or include elements of multiple colors. Style features include particular styles of elements in the document, for example, an "oil paint style" or other artistic style. Text features include specific combinations of characters (e.g., words, sentences, or other combinations) in text elements of the template. A feature representation represents the feature (object, layout, color, style, text) of the template and can be used to search for replacement templates to recommend to the user to be used in place of the template.

The feature representation, in some instances, is a vector representation in a dimensional vector space. The illustrator system, in some instances, applies a model to features extracted from the template to generate the feature representation. For example, the illustrator system extracts text from the template and generates a text feature representation by applying a text feature representation network to the extracted text. In some instances, the illustrator system generates a feature representation for each feature of the set of features. For example, the illustrator system generates, for the displayed template, an object feature representation, a layout feature representation, a color feature representation, a style feature representation, and a text feature representation. Each of the feature representations is aligned in a joint representation space with the other features of the set of features to enable cross-matching. For example, in the aligned features representations described herein, specific features (e.g., color, text, style, object, layout) that occur together in the same template are mapped to closer regions in the joint space.

The illustrator system receives a selection from among the set of features of a query feature and a target feature. For example, the user wants to find templates with color themes that go well with the image of the cast iron pan. In this example, the query feature is the object feature and the target feature is the color feature. In some instances, the illustrator application interface includes interface objects for selecting a query feature and a target feature and the illustrator system receives the selection responsive to the user making a selection of the query feature and the target feature in the illustrator application interface via the user interface of the user computing device. Responsive to receiving the selection of the query feature and the target feature, the illustrator system accesses a database of replacement templates and determines a score for each of the replacement templates based on an aligned query-view representation of the template and a respective aligned target-view representation of the replacement template. For example, the score is determined based on a product of the aligned query-view representation of the template and the respective aligned target-view representation of the respective replacement template. In certain embodiments, the illustrator system selects a predefined number (e.g., three, five, seven, or other predefined number) of replacement templates having a greatest score.

The illustrator system displays a preview of each of the set of replacement templates via the user interface. In certain embodiments, the illustrator system generates multiple previews to display with the template in an illustrator application interface. Each of the previews are associated with a replacement template. Each preview is a user interface object provides a visualization of one or more regions of, or the entirety of, the replacement template. When a preview is selected, the replacement template associated with the selected preview replaces the template in the illustrator application interface. In some instances, the illustrator system displays multiple previews in the user interface in the template, each of the multiple previews being associated with a replacement template.

The illustrator system replaces, responsive to receiving a selection of a preview of the set of displayed previews, the template with a replacement template associated with the selected preview. In certain embodiments, responsive to receiving a selection of a preview via the user interface, the illustrator system replaces the template with a replacement template associated with the selected preview. For example, the illustrator system displays, via the user interface, the replacement template instead of the template.

Example Operating Environment for Generating Previews of Suggested Replacement Templates that are Similar, Over a Selected Target Feature, to a Selected Query Feature of a Displayed Template Referring now to the drawings, FIG. 1 depicts an example of a computing environment 100 for generating, by an illustrator system 120, previews 115 of suggested replacement templates 116 that are similar, over a selected target feature 117-2, to a selected query feature 117-1 of a displayed template 114, according to certain embodiments disclosed herein. The computing environment 100 includes an illustrator system 120, which includes one or more processing devices that execute a recommendation subsystem 121 and representation generation subsystem 123. The computing environment 100 includes a user computing device 110, which includes a user interface 111 and an illustrator application 119. In certain embodiments, the user computing device 110 includes an illustrator system 120 which operates on the user computing device 110. In certain embodiments, however, the illustrator system 120 is a network server or other computing device connected to a network 130 that communicates with the user computing device 110 via the network 130.

An example user computing device 110 includes an illustrator application 119, a user interface 111, and a data storage unit 112. In certain embodiments, the user computing device 110 is a smart phone device, a personal computer (PC), a tablet device, or other user computing device 110.

The illustrator application 119, in some embodiments, is associated with an illustrator service and the user downloads the illustrator application 119 on the user computing device 110. For example, the user accesses an application store or a web site of the illustrator service using the user computing device 110 and requests to download the illustrator application 119 on the user computing device 110. The illustrator application 119 operates on the user computing device 110 and enables a user of the user computing device 110 to generate templates 114, edit templates 114 with one or more editing operations, request one or more replacement templates 116 that have similar designs to a displayed template 114, and select a replacement template 116 using a preview 115 object to replace the displayed template 114. The illustrator application 119 enables the user to interact, via the user interface 111 with the illustrator application 119. The illustrator application 119 can communicate with the user interface 111 to execute an illustrator application interface 113 on the user interface 111 to display information to a user and to receive one or more inputs from the user. The illustrator application 119 can instruct the user interface 111 to display a template 114, to display previews 115 of replacement templates 116 retrieved by the illustrator system 120, and display a replacement template 116 corresponding to a preview 115 selected via the user interface 111. In some embodiments, the illustrator application 119 communicates with one or more of the recommendation subsystem 121, the representation generation subsystem 123, or the data storage unit 124 of the illustrator system 120.

In certain embodiments, the illustrator application 119 includes the recommendation subsystem 121 and the representation generation subsystem 123 and performs the operations described herein as being performed by the subsystems 121 and 123. For example, in certain embodiments, the illustrator application 119 of the user computing device 110 generate previews 115 of replacement templates 116 for a displayed template 114.

The data storage unit 112 is accessible to the user computing device 110 and stores data for the user computing device 110. In some instances, the data storage unit 112 stores a template 114 that the user can request to display via the illustrator application interface 113. In some instances, the data storage unit 112 comprises the data storage 125.

The user interface 111 can include a touchscreen display interface, a display device (e.g., a monitor) with a separate input device (e.g., a mouse), or other user interface 111 which can receive one or more inputs from the user and display information or provide other output to the user. For example, the user interface 111 can execute an illustrator application interface 113.

The illustrator application interface 113 enables a user to view a template 114, edit a template 114 by adding, deleting, modifying, or replacing one or more elements of the template 114, generate a new template 114, delete a template 114, and/or perform other operations with respect to a template 114. The illustrator application interface 113 can provide an area to display a template 114 and, in some instances, an area to enter a query 117 to search for replacement templates 116. The area to enter the query 117 can include one or more user interface 111 objects that enable a user to select a query feature 117-1 and a target feature 117-2 from a set of features. For example, the features include color, text, layout, object, and style features. The illustrator application interface 113, in some instances, includes an area for displaying previews 115 (e.g., N previews 115-1, 115-2, . . . 115-N) of replacement templates generated by the illustrator system 120. The illustrator application interface 113 enables selection of any of the displayed previews 115 and, responsive to receiving a selection of a particular preview 115, displays a replacement template 116 associated with the selected particular preview 115 instead of the originally displayed template 114.

In certain embodiments, a template 114 is a document that includes multiple elements. In some instances, the template 114 is a layered document or other composite document. In some instances, the template 114 includes a multi-media presentation (e.g., a slide presentation). In some instances, the template 114 includes an audio clip. In some instances, the template 114 includes a video. The template 114 is displayed in an illustrator application 119 interface. Examples of an element include a layer, a region, or other object in a template 114. Some examples of elements include text objects, text layers, image objects, image layers, background layers, background objects, regions of an image object, and regions of a text object. In some instances, elements include individual slides in a multi-media presentation. In some instances, elements include keyframes of a video. In some instances, elements include portions of an audio clip.

The illustrator system 120 receives, in some instances, the template 114 from the user computing device 110 or otherwise access the template 114 that is displayed in an illustrator application interface 113 of the user computing device 110. For example, the illustrator application interface 113 is a window or other application interface of the illustrator application 119 displayed on the user interface 111 through which the user interacts with the template 114. The illustrator system 120 retrieves a set of replacement templates 116 for the template 114. In some examples, the illustrator system 120 retrieves the set of replacement templates 116 by comparing, over a feature of a set of features, the template 114 to replacement templates 116 in a database and selecting the set of replacement templates 116 having highest similarity scores to the template 114 over the feature. Further details about retrieving the set of replacement templates 116 are described herein in FIG. 2.

The illustrator system 120 generates and displays previews associated with the replacement template 116. The preview 115 is a user interface object displayed in the illustrator application interface 113 that provides a visual preview of the replacement template 116. In certain embodiments, the illustrator system 120 generates multiple previews 115 (e.g., previews 115-1, 115-2, . . . 115-n) for the set of replacement templates 116, where each of the multiple previews 115 is associated with a respective replacement template 116. When a preview 115 is selected (e.g., via selection of the preview 115-1 via the illustrator application interface 113), the illustrator system 120 updates the illustrator application interface 113 to display the replacement template 116-1 associated with the preview 115-1.

The illustrator system 120 (including the recommendation subsystem 121 and the representation generation subsystem 123) may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the illustrator system 120 (including the recommendation subsystem 121 and the representation generation subsystem 123) can be implemented using more or fewer systems or subsystems than those shown in FIG. 1, combines two or more subsystems, or has a different configuration or arrangement of the systems or subsystems.

Figure 5:
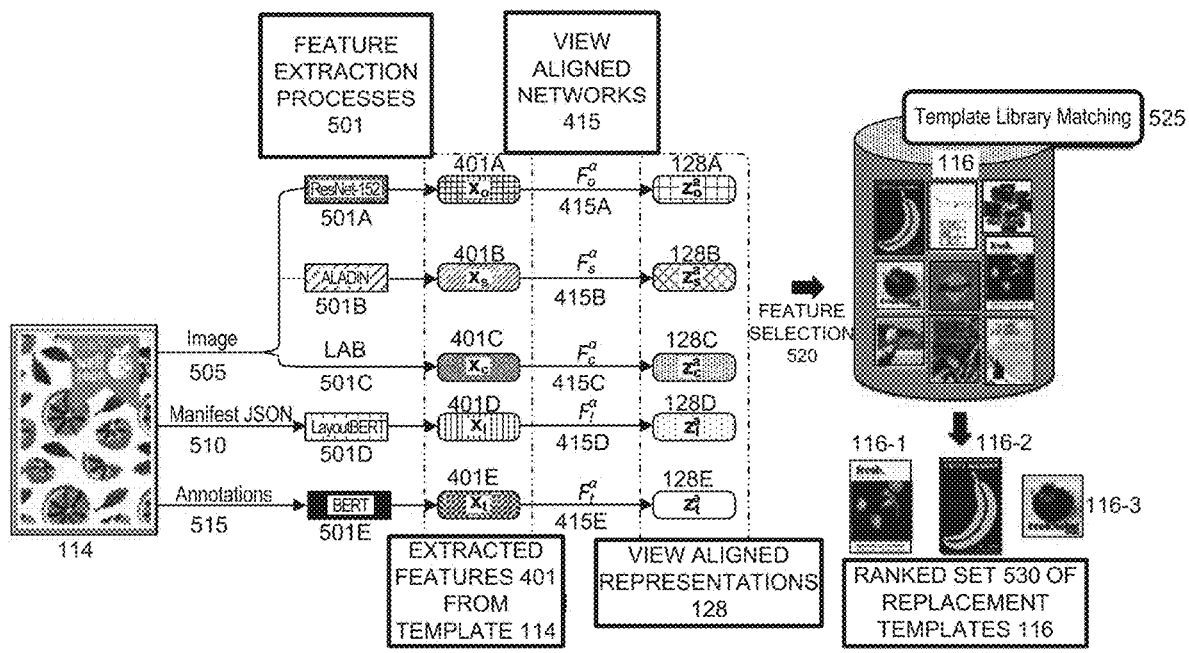
FIG. 5 depicts an illustration of a process for indexing replacement templates and for selecting a set of replacement templates for use in generating previews, according to certain embodiments described herein, according to certain embodiments disclosed herein.

In some examples, the illustrator system 120 comprises a recommendation subsystem 121, a representation generation subsystem 123, and a data storage unit 125. The illustrator system 120 accesses or otherwise receives a template 114, retrieves a set of replacement templates 116 for the template 114, and generates a set of previews 115 for the set of replacement templates 116 for display via the user interface 111. The illustrator system 120 receives, in some instances, the template 114 from the illustrator application 119. FIG. 5 depicts an illustration of an example template displayed in a user interface, according to certain embodiments disclosed herein. The intent determination module 121 determines the set of replacement templates 116 for the template 114.

In certain examples, the representation generation subsystem 123 generates, for each of a set of N replacement templates 116 (e.g., replacement template 116-1, replacement template 116-2, . . . replacement template 116-N), a respective representation for each of a set of features (e.g., views, design aspects). In some instances, a representation comprises an embedding, a vector, or other representation that describes a feature (e.g., color, style, layout, text, or object feature) based on elements in the replacement template 116. The representation generation subsystem 123 generates, for each of a set of features of the replacement template 116, a respective view-specific representation 127 and a respective view-aligned representation 128 and associates the generated representations with the replacement template 116. For example, a replacement template 116-1 is associated with a respective view-aligned representation 128 generated for each of a set of features (e.g., views) including an object view-aligned representation 128A, a style view-aligned representation 128B, a color view-aligned representation 128C, a layout view-aligned representation 128D, and a text view-aligned representation 128E. In this example, the replacement template 116-1 is associated with a respective view-specific representation 127 generated for each of the set of features, including an object view-specific representation 127A, a style view-specific representation 127B, a color view-specific representation 127C, a layout view-specific representation 127D, and a text view-specific representation 127E. Further details are provided in FIG. 3 that describe generating representations, including view-specific representations 127 and view-aligned representations 128, representing each replacement template 116 and indexing the replacement templates 116 according to the generated representations.

The data storage unit 125 is a memory accessible to the illustrator system 120. The data storage unit 125, in some examples, includes a database of replacement templates 116 from which the illustrator system 120 retrieves, based on content in a displayed template 114, candidate replacement templates 116 (e.g., 116-1, 116-2, . . . 116-N) for use in generating a set of previews 115. The data storage unit 125, in some instances, stores, for each replacement template 116, one or more representations (e.g., a respective view-specific representation 127 and/or a respective view-aligned representation 128) representing specific features in the respective replacement template 116. For example, each replacement template 116 is indexed based on a respective view-aligned representation 128 for each of a color feature, a style feature, a text feature, an object type feature, and a style feature.

As depicted in FIG. 1, a user computing device 110 can display a template 114 via an illustrator application interface 113 operating on a user interface 111 of the user computing device 110. The illustrator application interface 113 can enable the user to interact with services performed by the illustrator application 119 or the illustrator system 120. For example, the user can access the illustrator application interface 113 and request to generate a new template 114 and add one or more elements to the template 114 (e.g., a background element and an image element).

As depicted in FIG. 1, the illustrator application interface 113 can display, responsive to receiving an input via the user interface 111, previews 115 (e.g., previews 115-1, 115-2, . . . 115-N) of replacement templates 116 retrieved by the recommendation subsystem 121 of the illustrator system 120 responsive to a query 117. The query 117 can include a selection of a query feature 117-1 and a selection of a target feature 117-2. For example, the displayed template 114 includes a solid light blue background element and an image element of a cast iron pan, and the user selects an object query feature 117-1 and a color target feature 117-2. In this example, by selecting these specific query and target features 117-1 and 117-2, the user is requesting that the recommendation subsystem 121 retrieve a set of replacement templates 116 that include a diverse set of color features that co-occur with the frying pan object type and generate previews 115 of replacement templates 116 for display via the illustrator application interface 113.

As depicted in FIG. 1, the illustrator application interface 113 can display, responsive to receiving a selection of a preview 115 (e.g., a selection of preview 115-1 as illustrated in FIG. 1), display a replacement template 116 (e.g., replacement template 116-1 as illustrated in FIG. 1) associated with selected preview 115. The illustrator application interface 113 displays the replacement template 116 instead of the originally displayed template 114.

Figure 2:
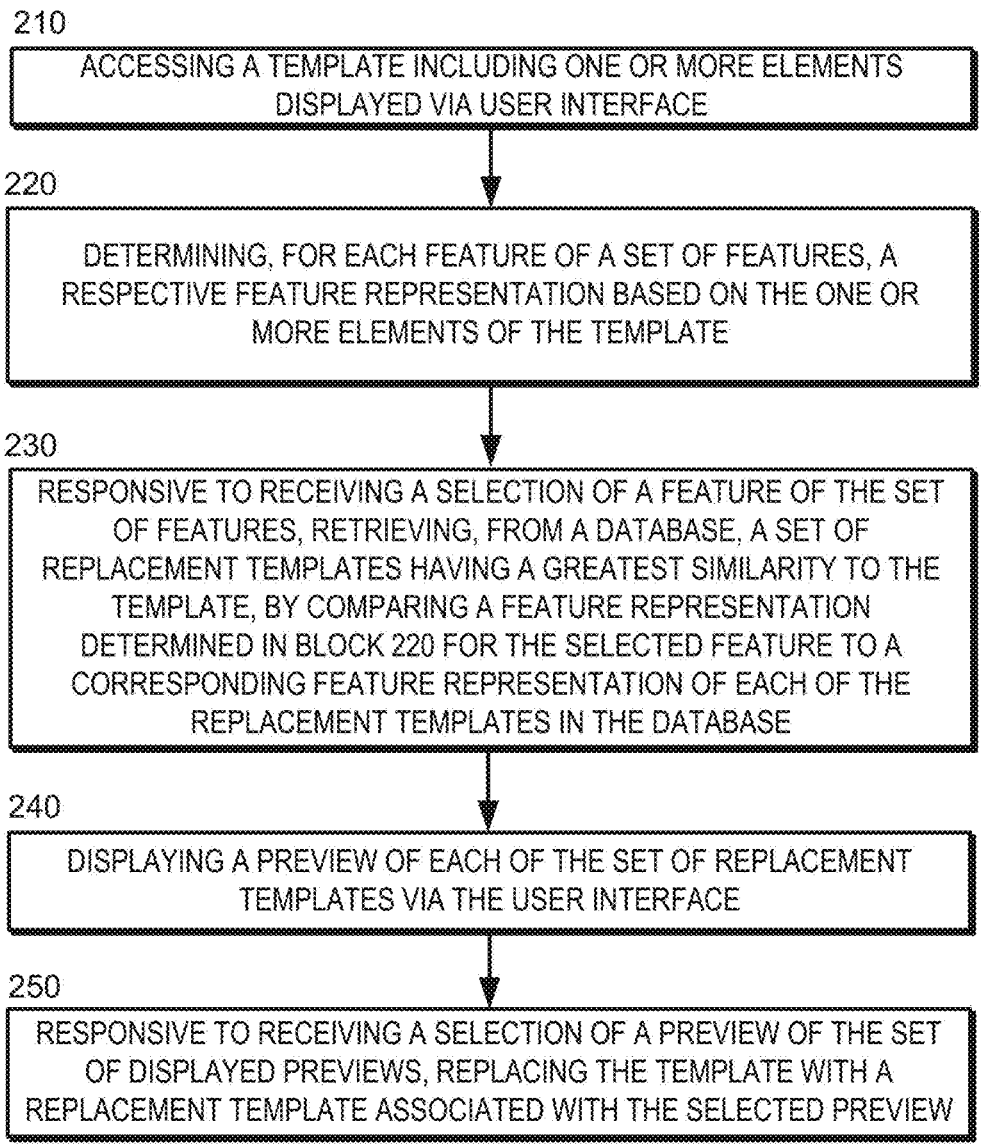
FIG. 2 depicts an example of a method for generating previews of suggested replacement templates that are similar, over a selected target feature, to a selected query feature of a displayed template, according to certain embodiments described herein.

Examples of Computer-Implemented Operations for Generating Previews of Suggested Replacement Templates that are Zoomed to Focus on a Change to a Specific Element FIG. 2 depicts an example of a method 200 for generating, by an illustrator system 120, previews 115 of suggested replacement templates 116 that are similar, over a selected target feature 117-2, to a selected query feature 117-1 of a displayed template 114, according to certain embodiments described herein. One or more computing devices (e.g., illustrator system 120 or the individual subsystems 121 and/or 123 included therein) implement operations depicted in FIG. 2. For illustrative purposes, the method 200 is described with reference to certain examples depicted in the figures. Other implementations, however, are possible. In certain examples, a recommendation subsystem 121 retrieves a set of recommended replacement templates 116 (e.g. replacement templates 116-1, 116-2, . . . 116-N) for a template 114 displayed in an illustrator application interface 113 and generates, for display in the illustrator application interface 113, a respective preview 115 associated with each of the set of recommended replacement templates 116 (e.g. previews 115-1, 115-2, . . . 115-N). Each displayed preview 115 is a user interface object displayed in the illustrator application interface 113 that provides a visual preview of an associated replacement template 116. In certain embodiments, the recommendation subsystem 121 generates multiple previews (e.g., previews 115-1, 115-2, . . . 115-n) of replacement templates 116 for the template 114, where each of the multiple previews 115 is associated with a respective replacement template 116. In the example depicted in FIG. 1, the preview 115-1 is associated with the replacement template 116-1, the preview 115-2 is associated with the replacement template 116-2, and the preview 115-N is associated with the replacement template 116-N. The recommendation subsystem 121 updates the illustrator application interface 113 to display the template 114 along with the multiple generated previews 115. In this example, each preview 115 (e.g., preview 115-1, preview 115-2, . . . preview 115-N) provides a view of the respective replacement template 116 (e.g., replacement template 116-1, replacement template 116-2, . . . replacement template 116-N). The recommendation subsystem 121, responsive to selection of a preview 115 of the set of previews 115, displays, via the illustrator application interface 113 and instead of the template 114, the replacement template 116 associated with the selected preview 115.

At block 210, the method 200 involves accessing, by the recommendation subsystem 121, a template 114 including one or more elements. In some instances, the template 114 is a layered document and the elements are a plurality of layers in the layered document. In some instances, the elements include objects in the template 114, for example, image objects, text objects, shape object, drawn objects, a background object, or other objects. In some instances, elements are regions of the template 114. In some instances, elements are chronological portions of the template 114, for example, slides in a slide presentation, keyframes in a video, and/or portions of audio in an audio clip. The template 114 could be a slide presentation, a video, an audio clip, a word processing document, or other document. In an example, the user accesses the illustrator system 120 (in some embodiments, the illustrator application 119) via the user interface 111 and requests to generate a new template 114 by selecting one or more objects on the user interface 111. In this example, responsive to the request to generate a new template 114, the illustrator system 120 (or illustrator application 119, if applicable) displays the new template 114 within the illustrator application interface 113. In certain examples, the request for a new template 114 comprises a request to display a saved template 114 and the illustrator system 120 (or the illustrator application 119, if applicable) accesses the displays the saved template 114 and displays the saved template 114 in the illustrator application interface 113. In some instances, the user can edit the displayed template 114 using the illustrator application interface 113 by, for example, adding, deleting, editing, duplicating, moving, rearranging, resizing, rotating, changing a color of, changing a shading of, adding text to, removing text from, editing text of, or otherwise editing one or more element(s) in the displayed template 114.

At block 220, the method 200 involves determining, using the recommendation subsystem 121, for the template 114, and for each feature of a set of features, a respective feature representation based on the one or more elements of the template 114. For example, the representation generation subsystem 123 generates an object representation, a style representation, a color representation, a layout representation, and a text representation for the template 114. In this example, the representation generation subsystem 123 determines object features, style features, color features, layout features, and text features of the template 114. In this example, the representation generation subsystem 123 applies respective machine learning models to the object, style, color, layout, and text features to determine the representation of the template 114 corresponding to each feature. The representations generated for each of the features of the template 114, which can be used for searching for replacement templates 116, may be view-aligned, that is, represented in a joint space. For example, the representation generation subsystem 123 generates an object view-aligned representation 128A, a style view-aligned representation 128B, a color view-aligned representation 128C, a layout view-aligned representation 128D, and a text view-aligned representation 128E for the template 114. Further details about determining the representation for each feature of the template 114 is described herein in FIG. 3.

At block 230, the method 200 involves retrieving from a database, using the recommendation subsystem 121 and responsive to receiving a selection of a first feature and a second feature of the set of features, a set of replacement templates 116 having second feature representations that are most aligned with the first feature representation of the template 114. For example, the first feature is a query feature 117-1 and the second feature is a target feature 117-2. In certain embodiments, the illustrator system 120 displays, via the illustrator application interface 113, one or more interface objects for selecting a query feature 117-1 and a target feature 117-2 by the user. The user can select any sequence of two features as the query feature 117-1 and the target feature 117-2. In some examples, the illustrator application interface 113 has input fields or selection menus for each of the query feature 117-1 and the target feature 117-2. In some instances, the illustrator interface 113 has a set of selectable interface objects associated with each of the features, where the first interface object selected corresponds to the query feature 117-1 and the second interface object selected corresponds to the target feature 117-2, or vice versa. By selecting a query feature 117-1 and a target feature 117-2, the user communicates a desire to search for replacement templates 116 with the target feature that go well with the query feature 117-1. For example, if the user selects "color" as the target feature 117-2 and "object" as the query feature 117-1, the user communicates a desire to find replacement templates 116 that have color features/schemes that go well with the object types in the displayed template 114. In another example, if the user selects "layout" as the target feature 117-2 and "object" as the query feature 117-1, the user communicates a desire to find replacement templates 116 that have layout features that go well with the object types in the displayed template 114. In another example, if the user selects "layout" as the target feature 117-2 and "text" as the query feature 117-1, the user communicates a desire to find replacement templates 116 that have layout features that go well with the text features of the displayed template 114. In some instances, the recommendation subsystem 121 accesses a database of replacement templates 116 and determines a score, $s_{c,d}$, for each replacement template 116 by finding a product of a target feature 117-2 representation of the respective replacement template 116 and the query feature 117-1 representation of the displayed template 114, as follows:

$$s_{c,d} = (c_m^a \cdot d_m^a) \quad (1)$$

In Equation (1), $c_m^a$ represents the view-aligned representation 128 for the template 114 associated with the query feature 117-1 and $d_m^a$ represents the view-aligned representation for a respective replacement template 116 associated with the target feature 117-2. In certain embodiments, the database of replacement templates 116 is ranked in a descending order of similarity scores computed using Equation (1) and a predefined number of previews 115 of replacement templates 116 having the greatest similarity scores are displayed to the user. FIG. 5 describes further details about retrieving a set of replacement templates 116 for a template 114 responsive to receiving a selection of a query feature 117-1 and a target feature 117-2.

At block 240, the method 200 involves displaying, using the recommendation subsystem 121, a preview 115 of each of the set of replacement templates 116 retrieved in block 230 via a user interface 111. In certain embodiments, the recommendation subsystem 121 generates multiple previews 115 to display with the template 114 in the illustrator application interface 113. Each of the previews 115 is associated with a respective replacement template 116 of the set of replacement templates 116 retrieved at block 230. Each preview 115 is a user interface 111 object providing a visualization of one or more regions of, or an entirety of, the replacement template 116. In some instances, the preview 115 provides a visualization of a scaled down version of the replacement template 116. Illustrations of previews 115 of replacement templates 116 displayed along with a template 114 are shown in FIGS. 6A, 7A, 8A, 9, and 10.

At block 250, the method 200 involves replacing, using the recommendation subsystem 121 responsive to receiving a selection of a preview 115 of the set of displayed previews 115, replacing the template 114 with a replacement template 116 associated with the selected preview 115. When a preview 115 is selected via the user interface 111, the replacement template 116 associated with the selected preview 115 replaces the template 114 in the illustrator application interface 113. Replacing the template 114, in some instances, means ceasing to display the template 114 and displaying the replacement template 116 in a same area of the illustrator application interface 113 previously occupied by the template 114.

Figure 3:
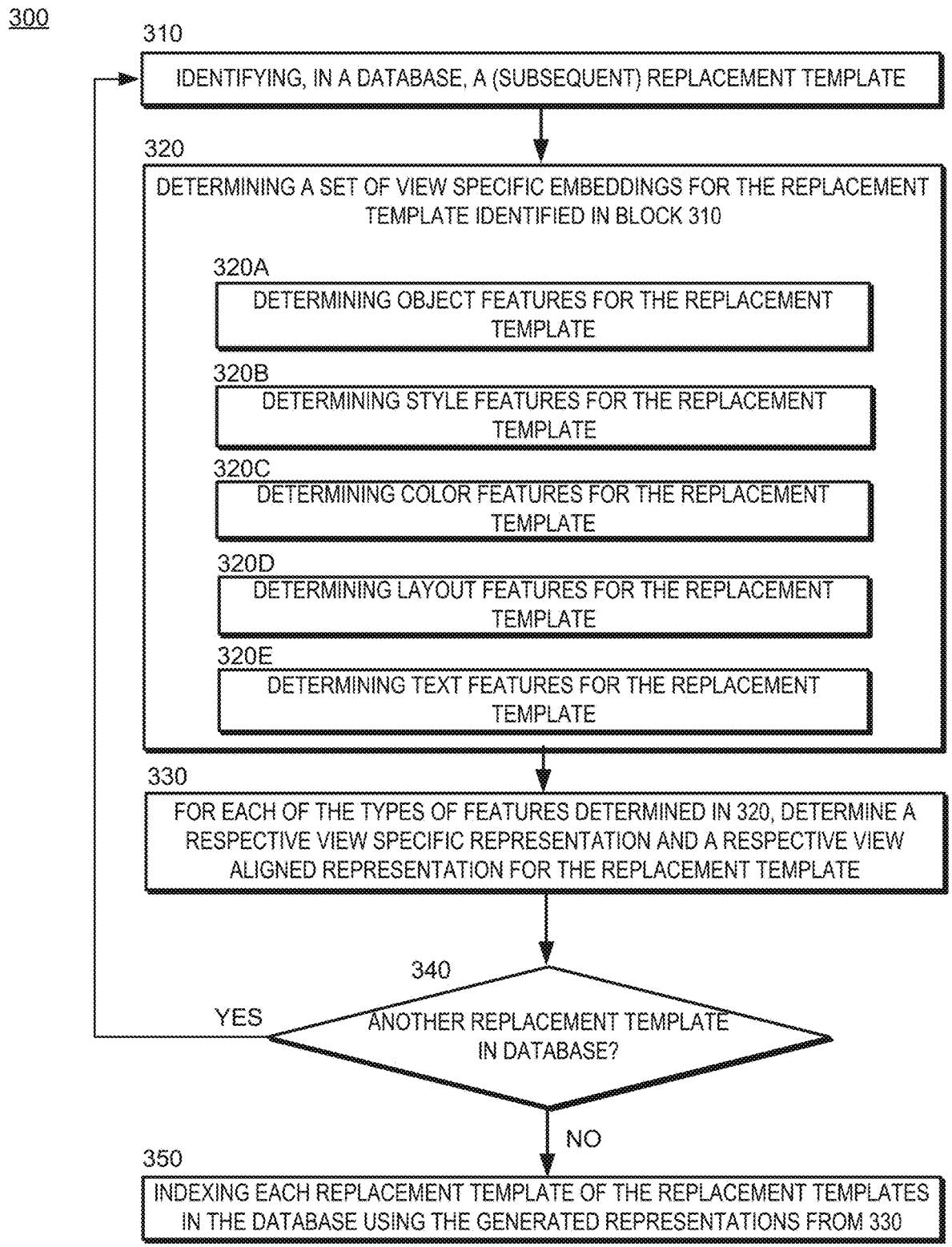
FIG. 3 depicts an example of a method for indexing replacement templates including, for each replacement template, generating a feature representation for each of a set of features, according to certain embodiments described herein.

FIG. 3 depicts an example of a method 300 for indexing, by an illustrator system 120, replacement templates 116 including, for each replacement template 116, generating a feature representation for each of a set of features, according to certain embodiments described herein. One or more computing devices (e.g., illustrator system 120 or the individual subsystems 121 and/or 123 included therein) implement operations depicted in FIG. 3. For illustrative purposes, the method 300 is described with reference to certain examples depicted in the figures. Other implementations, however, are possible. In certain embodiments, the method 300 is used to index a database of replacement templates 116 for use by the recommendation subsystem 121 in finding a set of replacement templates 116 responsive to receiving a query 117. For example, at block 230 of method 200 of FIG. 2 and at step 525 of FIG. 5, the recommendation subsystem 121 can access a database including replacement templates 116 indexed according to method 300.

At block 310, the method 300 involves identifying, by the representation generation subsystem 123 in a database, a replacement template 116. Blocks 310, 320, 330 are performed, in certain embodiments, for each replacement template 116 in the database. In certain embodiments, the replacement templates 116 are templates 114 generated by multiple users of the illustrator application 119.

At block 320, the method 300 involves determining, by the representation generation subsystem 123, a set of view-specific representations 127 for the replacement template 116 identified in block 310. Implementing block 320 of method 300 includes, in certain embodiments, implementing one or more of subblocks 320A, 320B, 320C, 320D, and 320E, which describe determining, for a replacement template 116, features for each of five feature types (e.g., object type features, style features, color features, layout features, and text features). Subblocks 320A, 320B, 320C, 320D, and 320E can be performed in a different order than depicted in FIG. 3 and/or one or more of these subblocks can be performed simultaneously. In certain embodiments, the representation generation subsystem 123 can determine further types of features other than for the five example feature types depicted in FIG. 3. For example, the representation generation subsystem 123 can determine seven, ten, twelve, or other predefined number of types of features of the replacement template 116. In certain embodiments, the representation generation subsystem 123 can determine a lesser number of features than the five example features depicted in FIG. 3. For example, the representation generation subsystem 123 may perform, in some embodiments, subblocks 320A, 320B, and 320C and not perform subblocks 320D and 320E.

At subblock 320A, the method for implementing block 320 of method 300 involves determining object features for the replacement template 116. To determine the object features, the representation generation subsystem 123 applies a neural network to the replacement template 116 that is trained for an object detection task. In certain embodiments, the neural network comprises a residual neural network ("ResNet"), for example, a ResNet-152 network. In certain embodiments, the object features comprise a dimensional embedding (e.g., a 2048-dimensional embedding) from a penultimate layer of a ResNet network that is applied to the replacement template 116. In certain embodiments, other neural networks may be used to determine the object features instead of or in addition to a ResNet.

At subblock 320B, the method for implementing block 320 of method 300 involves determining style features for the replacement template 116. To determine the style features, the representation generation subsystem 123 applies a neural network to the replacement template 116 that is trained to represent a style of images. In certain embodiments, the neural network comprises an all layer adaptive instance normalization ("ALADIN") architecture of a predefined dimensionality (e.g., dimensionality of 256) that is trained to retrieve images based on an artistic style similarity. In certain embodiments, other neural networks may be used to determine the style features instead of or in addition to an ALADIN neural network.

At subblock 320C, the method for implementing block 320 of method 300 involves determining color features for the replacement template 116. To determine the color features, the representation generation subsystem 123 utilizes a LAB color space, which defines color using an 'L' channel corresponding to lightness/luminance and two channels, A and B, representing a chrominance. In some instances, the representation generation subsystem 123 discretizes a range of L, A, and B values into bins of predetermined width (e.g., 10, 10, 10) and obtains an embedding of a predefined size (e.g., a 1000-dimensional color embedding) as a histogram over what fraction of pixels correspond to a particular LAB value. In some instances, the representation generation subsystem 123 generates color features that are perceptually uniform where distances in LAB space correspond to similar visually perceived changes in color. In certain embodiments, other color spaces may be used to determine the color features instead of or in addition to a LAB space.

At subblock 320D, the method for implementing block 320 of method 300 involves determining layout features for the replacement template 116. To determine the layout features, the representation generation subsystem 123 applies neural network to the replacement template 116 that is trained to extract representations of a predefined dimensionality (e.g., 512-dimensional layout representations) using outputs of a bidirectional encoder representations from transformers ("BERT") architecture for a layout view. In some instances, the neural network (e.g., a LayoutBERT architecture) is applied to layout annotations in manifest JavaScript object notations ("JSONs") of the replacement template 116. In certain embodiments, other neural networks may be used to determine the layout features instead of or in addition to a LayoutBERT network.

At subblock 320E, the method for implementing block 320 of method 300 involves determining text features for the replacement template 116. To determine the text features, the representation generation subsystem 123 applies neural network to the replacement template 116 that is trained to extract text representations. In certain embodiments, the neural network comprises a BERT model and the representation generation subsystem 123 generates the text features by applying the BERT model to text taken from annotations in the replacement template 116 metadata to extract a text representation of a predefined dimensionality (e.g., a 768-dimensional text representation) for a text view. In certain embodiments, other neural networks may be used to determine the text features instead of or in addition to a BERT model.

From block 320, the method 300 proceeds to block 330.

At block 330, the method 300 involves determining, by the representation generation subsystem 123 for the replacement template 116, a respective view-aligned embedding 128 for each of the feature types (e.g., text, color, layout, object, style) determined for the replacement template 116 in block 320. The features captured in block 320 for each of the feature types (e.g., color, layout, object, text, style) represent a diverse set of design aspects of the replacement template 116. Performing block 330 aligns the features by considering that design aspects that occur together in the same replacement template 116 should be mapped to closer regions in a joint feature space. In certain embodiments, the representation generation subsystem 123 aligns the feature types by factoring each of the determined features into a view-specific representation 127 and a view-aligned representation 128. In these embodiments, the features can be reconstructed by recombining the view-specific representation 127 and the view-aligned representation 128. For example, for color features determined for a replacement template 116, the representation generation subsystem 123 determines a color view-specific representation 127 and a color view-aligned representation 128. Beginning with an input representation (e.g., features determined in subblock 320A, 320B, 320C, 320D, or 320E), $x_{mi} \in \mathbb{R}^{d_m}$, where $m \in \mathcal{M}$ represents a set of views. For example, $\mathcal{M}$ represents the set {color, layout, text, object, style}. The representation generation subsystem 123 retrieves one input representation $x_{mi}$ for each data point i (e.g., each replacement template 116) and every feature channel m (each feature of the set of features). The representation generation subsystem 123 applies, to the input representation $x_{mi}$, a view-specific (p) representation network $F_m^p$ to generate a view-specific representation $z_{mi}^p$, which can be represented as:

$$z_{mi}^p = F_m^p(x_{mi}) \qquad (2)$$

The representation generation subsystem 123 applies, to the input representation $x_{mi}$, a view-aligned (a) representation network $F_m^a$ to generate a view-aligned representation $z_{mi}^a$, which can be represented as:

$$z_{mi}^a = F_m^a(x_{mi}) \qquad (3)$$

The representation generation subsystem 123 applies, to the input representation $x_{mi}$, a reconstruction network $F_m^r$ to generate a reconstructed feature channel $\bar{x}_{mi}$, which can be represented as:

$$\bar{x}_{mi} = F_m^r([z_{mi}^p; z_{mi}^a]) \qquad (4)$$

In some embodiments, each of the view-specific representation network $F_m^p$, the view-aligned representation network $F_m^a$, and the reconstruction network $F_m^r$, is a two-layer feed-forward network including ReLU non-linear activation between layers. Using the reconstruction network $F_m^r$ ensures that no information is lost. In some instances, the representation generation subsystem 123 vertically stacks individual feature representations to form matrices $\mathcal{X}_m = [x_{mi}]$ that include input representations $x_{mi}$, matrices $\mathcal{Z}_m^p = [z_{mi}^p]$ that include view-specific representations 127, matrices $\mathcal{Z}_m^a = [z_{mi}^a]$ that include view-aligned representations 128, and matrices $\bar{\mathcal{X}}_m = [\bar{x}_{mi}]$ that include reconstructed per-channel representations $\bar{x}_{mi}$.

Figure 4:
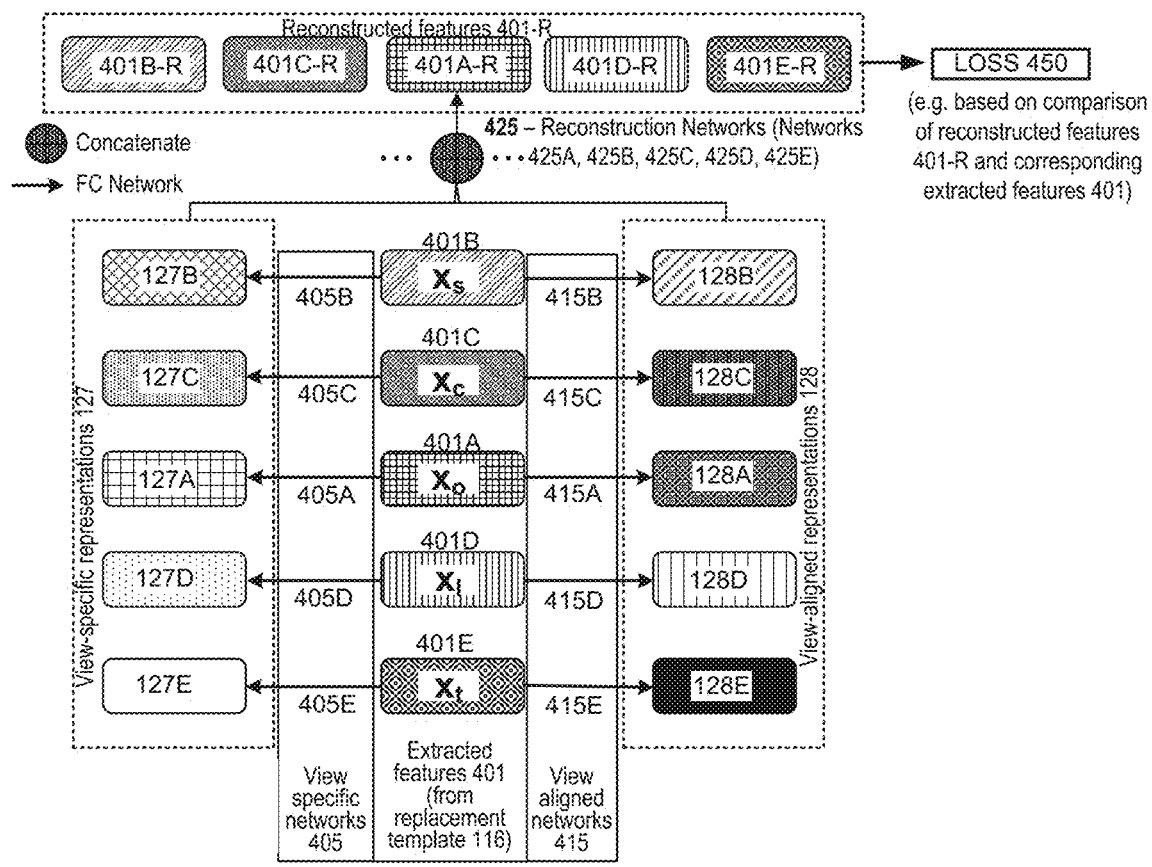
FIG. 4 depicts an illustration of a process for determining feature representations for a template by applying a set of neural networks to features extracted from the template and for training the neural networks

Further details about the view-specific representation networks $F_m^p$, the view-aligned representation networks $F_m^a$, and the reconstruction network $F_m^r$, as well as details about the training of these networks, are provided in FIG. 4.

At block 340, the method 300 involves determining, by the representation generation subsystem 123, whether the replacement template 116 database includes a subsequent replacement template 116. For example, blocks 320 and 330 are repeated for each replacement template 116 in the replacement template 116 database (e.g., data storage unit 125) until a view-aligned representation 128 is generated for each of the feature types for each replacement template 116. For example, the representation generation subsystem 123 repeats block 320 and 330 to determine, for each replacement template 116, a respective color view-aligned representation 128, a respective layout view-aligned representation 128, a respective object view-aligned representation 128, a respective text view-aligned representation 128, and a respective style view-aligned representation 128.

If the representation generation subsystem 123 identifies a subsequent replacement template 116 for which view-aligned representations 128 have not been determined, the method 300 returns to block 320 and repeats block 320 and 330 for the identified subsequent replacement template 116.

Returning to block 340, if the representation generation subsystem 123 does not identify a subsequent replacement template 116 for which view-aligned representations 128 have not been determined, the method 300 proceeds to block 350.

At block 350, the representation generation subsystem 123 indexes each replacement template 116 of the replacement templates 116 in the replacement template 116 database using the view-aligned representations 128 generated in block 330 for each type of feature determined in block 320 (e.g., color, text, layout, object, style features). Indexing the replacement template 116 in the database can include, in some instances, associating, in the database, a replacement template 116 identifier identifying the replacement template 116 with each of the set of view-aligned representations 128 (e.g. color view-aligned representation, text view-aligned representation, layout view-aligned representation, style view-aligned representation, object view-aligned representation) determined for the replacement template 116. In certain embodiments (e.g. at block 230 of FIG. 2), the recommendation subsystem 121 can search the indexed replacement templates 116 using a feature representation (e.g. a view-aligned representation 128) associated with a particular feature (e.g. color, style, text, object, or layout features) extracted from a displayed template 114 to find a predetermined number (e.g. three, five, ten, or other predetermined number) of replacement templates 116 having feature representations representing the particular feature that are most similar to the feature representation of the displayed template 114.

FIG. 4 depicts an illustration of a method 400 for determining, by an illustrator system 120, feature representations for a template by applying a set of neural networks to features extracted from the template and for training the neural networks. For illustrative purposes, FIG. 4 is described with reference to certain examples depicted in the figures. Other implementations, however, are possible. The representation generation subsystem 123 determines extracted features 401 from a replacement template 116. Further details about determining extracted features 401 for a replacement template 116 (or, in some instances, for a displayed template 114) are described in block 320 of FIG. 3. For example, the representation generation subsystem 123 determines the extracted object features 401A by applying subblock 320A of FIG. 3, determines the extracted style features 401B by applying subblock 320B of FIG. 3, determines the extracted color features 401C by applying subblock 320C of FIG. 3, determines the extracted layout features 401D by applying subblock 320D of FIG. 3, and determines the extracted text features 401E by applying subblock 320E of FIG. 3.

As depicted in FIG. 4, the representation generation subsystem 123 transforms the extracted features 401 into view-specific representations (e.g., 127A, 127B, 127C, 127D, 127E) by applying view-specific networks 405 (e.g., 405A, 405B, 405C, 405D, 405E) to the respective extracted features 401. The view-specific networks 405 are configured to encourage orthogonalization among the view-specific representations 127. For example, the representation generation subsystem 123 applies an object view-specific network 405A to the extracted object features 401A to generate an object view-specific representation 127A. The representation generation subsystem 123 applies a style view-specific network 405B to the extracted style features 401B to generate a style view-specific representation 127B. The representation generation subsystem 123 applies a color view-specific network 405C to the extracted color features 401C to generate a color view-specific representation 127C. The representation generation subsystem 123 applies a layout view-specific network 405D to the extracted layout features 401D to generate a layout view-specific representation 127D. The representation generation subsystem 123 applies a text view-specific network 405E to the extracted text features 401E to generate a text view-specific representation 127E.

Also, as depicted in FIG. 4, the representation generation subsystem 123 transforms the extracted features 401 into view-aligned representations (e.g., 128A, 128B, 128C, 128D, 1278) by applying view-aligned networks 415 (e.g., 415A, 415B, 415C, 415D, 415E) to the respective extracted features 401. The view-aligned networks 415 are configured to capture, in the view-aligned representations 128, common information across views (e.g., across color, layout, text, style, and object features). For example, the representation generation subsystem 123 applies an object view-aligned network 415A to the extracted object features 401A to generate an object view-aligned representation 128A. The representation generation subsystem 123 applies a style view-aligned network 415B to the extracted style features 401B to generate a style view-aligned representation 128B. The representation generation subsystem 123 applies a color view-aligned network 415C to the extracted color features 401C to generate a color view-aligned representation 128C. The representation generation subsystem 123 applies a layout view-aligned network 415D to the extracted layout features 401D to generate a layout view-aligned representation 128D. The representation generation subsystem 123 applies a text view-aligned network 415E to the extracted text features 401E to generate a text view-aligned representation 128E.

As depicted in FIG. 4, the representation generation subsystem 123 applies reconstruction networks 425 (e.g. an object feature reconstruction network 425A, a style feature reconstruction network 425B, a color feature reconstruction network 425C, a layout feature reconstruction network 425D, and a text feature reconstruction network 425E) to concatenations of the view-specific representations 127 and the view-aligned representations 128 to generate reconstructed features 401-R (e.g., reconstructed object features 401A-R, reconstructed style features 401B-R, reconstructed color features 401C-R, reconstructed layout features 401D-R, and reconstructed text features 401E-R). Concatenation can involve appending the representations. In an example, a view-specific representation 127 comprises 10 dimensions, a view-aligned representation 128 comprises 10 dimensions, and therefore the concatenated representation of the representations 127 and 128 comprises 20 dimensions. For example, the representation generation subsystem 123 generates, on a per-feature basis, the view-specific representations 127 and corresponding view-aligned representations 128 such that reconstructed features 401-R can be generated by applying the reconstruction networks 425 to the concatenated representations 127 and 128. For example, the representation generation subsystem 123 concatenates a view-specific representation 127 for a color feature with a corresponding view-aligned representation 128 for the color feature, concatenates a view-specific representation 127 for a text feature with a corresponding view-aligned representation 128 for the text feature, and so forth. Then, for each feature, the representation generation subsystem 123 applies a feature-specific reconstruction network 425 to the concatenated features. For example, a color reconstruction network 425C is applied to the concatenation of the color view-specific representation 127C and its corresponding color view-aligned representation 128C to generate reconstructed color features 401C-R, a text reconstruction network 425 is applied to the concatenation of the text view-specific representation 127E and its corresponding text view-aligned representation 128E to generate reconstructed text features 401E-R, and so forth.

As shown in FIG. 4, the representation generation subsystem 123 determines a loss 450. The representation generation subsystem 123, in some instances, determines the loss 450 by comparing one or more of the reconstructed features 401-R (e.g. reconstructed features 401A-R, 401B-R, 401C-R, 401D-R, and 401E-R) to one or more of the extracted features 401 (e.g. extracted features 401A, 401B, 401C, 401D, and 401E) that were determined from the replacement template 116. Further details concerning determining the loss 150, which may include one or more losses, is described in the following paragraphs.

In certain embodiments, the loss 150 is determined using a single loss function. In certain embodiments, the loss 150 is determined using a combined loss function that includes multiple specific loss functions. In some instances, the representation generation 123 subsystem 123 determines a combined loss 150 ($\mathcal{L}$) based on one or more of a determined inter-view alignment loss ($\mathcal{L}_{ali}$), a determined inter-view orthogonalization loss ($\mathcal{L}_{spc}$), a determined intra-view information transfer loss ($\mathcal{L}_{inf}$), and a determined intra-view reconstruction loss ($\mathcal{L}_{rec}$), for example, as follows:

$$\mathcal{L} = \lambda_1 \cdot \mathcal{L}_{ali} + \lambda_2 \cdot \mathcal{L}_{spc} + \lambda_3 \cdot \mathcal{L}_{inf} + \lambda_4 \cdot \mathcal{L}_{rec} \quad (5)$$

where $\lambda_1$, $\lambda_2$, $\lambda_3$, and $\lambda_4$ are configurable weights.

In certain embodiments, during a training phase, the view-specific networks 405, the view-aligned networks 415, and the reconstruction network 425 are trained using the loss 150, which can include one or more of the loss functions $\mathcal{L}_{ali}$, $\mathcal{L}_{spc}$, $\mathcal{L}_{inf}$, and $\mathcal{L}_{rec}$ and, in some instances, is trained using the combined loss function L described herein. Optimization of the objective in Equation (5) does not depend on labels, which makes the disentanglement approach of the training phase self-supervised. The formulations described herein for the combined loss function $\mathcal{L}$ and the individual loss functions $\mathcal{L}_{ali}$, $\mathcal{L}_{spc}$, $\mathcal{L}_{inf}$, and $\mathcal{L}_{rec}$ are examples and, in certain embodiments, different formulations can be used. Training the networks 405, 415, and 415 can include changing one or more weights or parameters of the respective network(s) to minimize one or more of the loss functions described herein.

In certain embodiments, determining and considering the inter-view alignment loss $\mathcal{L}_{ali}$, the representation generation subsystem 123 encourages learning view-aligned representations 128 that are close to each other by rewarding an increased similarity between aligned representations of a same data point from different views (e.g., color/view/style/object/layout views). For example, the representation generation subsystem 123 determines the inter-view alignment loss $\mathcal{L}_{ali}$ as follows:

$$\mathcal{L}_{ali} = -\sum_{(m,m')} \left[ \sum_{i:1 \text{to} N} \left( \log\left( \frac{\exp\left(Z_m^a * Z_{m'}^{a^T}\right)_{i,i}}{\sum_{j:1 \text{to} N} \exp\left(Z_m^a * Z_{m'}^{a^T}\right)_{i,j}} \right) + \log\left( \frac{\exp\left(Z_m^a * Z_{m'}^{a^T}\right)_{i,i}}{\sum_{j:1 \text{to} N} \exp\left(Z_m^a * Z_{m'}^{a^T}\right)_{j,i}} \right) \right) \right]^2 \quad (6)$$

The inter-view alignment loss $\mathcal{L}_{ali}$ is a symmetric cross entropy loss (a CLIP loss) applied to a similarity matrix computed from the view-aligned representations 128, pairwise across views (e.g., m being a first view and m' being a second view of the pair). In the example Equation (6), N represents a batch size, (i,j) represents a value at an $i^{th}$ row and $j^{th}$ column of the similarity matrix. In certain examples, the batch size is ten or other predefined number. The loss function described in Equation (6) encourages $Z_m^a$ and $Z_{m'}^a$, which are the outputs of the view-aligned networks 415 ($F_*^a$), to be aligned. The example loss function of Equation (6) rewards an increased similarity between view-aligned representations 128 of the same data point from different views m and m', which are captured using the diagonal entries of the similarity matrix $Z_m^a * Z_{m'}^{a^T}$.

In certain embodiments, the inter-view orthogonalization loss ($\mathcal{L}_{spc}$) models view-specific information across views to improve a modeling of view-aligned representations 128. In some instances, the representation generation subsystem 123 uses an orthogonality constraint over pairs of views (m, m'), which minimizes an overlap among m and m'. In some instances, the inter-view orthogonalization loss is determined as follows:

$$\mathcal{L}_{spc} = \Sigma_{(m,m')} \| \mathcal{Z}_m^{p^T} * \mathcal{Z}_{m'}^{p} \|_2 \tag{7}$$

The vectors $z_*^p \in \mathcal{Z}_*^p$ (view-specific representations 127) are output by $\mathcal{F}_*^p$ (view-specific networks 405) and, in some instances, are normalized to be of unit norm. The inter-view orthogonalization loss is, in some instances, the L2-norm of a cross-correlation matrix between pairs of channels. In some instances, the inter-view orthogonalization loss serves to decorrelated different views of a same data point.

In certain embodiments, the intra-view information transfer loss ($\mathcal{L}_{inf}$) is used to prevent degenerate view-specific representations by encouraging the retaining of information within the channel. For example, a degenerate solution can be a trivial solution (e.g., all zero values). The intra-view information transfer loss is, in some instances, determined as follows:

$$\mathcal{L}_{inf} = -\sum_{(m,m')} \left[ \sum_{i:1 to N} \left( \log \left( \frac{\exp(\mathcal{X}_m * \mathcal{Z}_m^{p^T})_{i,i}}{\sum_{j:1 to N} \exp(\mathcal{X}_m * \mathcal{Z}_m^{p^T})_{i,j}} \right) + \log \left( \frac{\exp(\mathcal{X}_m * \mathcal{Z}_m^{p^T})_{i,i}}{\sum_{j:1 to N} \exp(\mathcal{X}_m * \mathcal{Z}_m^{p^T})_{j,i}} \right) \right) \right]^2 \tag{8}$$

Where the input representations $\mathcal{X}_{mi}$ are unit-length normalized. Because $\mathcal{X}_m$ and $\mathcal{Z}_m^p$ contain unit norm vectors, minimizing $\mathcal{L}_{inf}$ results in maximizing a cosine similarity between each datapoint's view-specific representation 127 and input representations (extracted features 401).

In certain embodiments, the representation generation subsystem 123 determines an intra-view reconstruction loss ($\mathcal{L}_{rec}$) as a mean squared error between the input representations (extracted features 401, $\mathcal{X}_{mi}$) and the reconstructed features 401R ($\bar{\mathcal{X}}_{mi}$). The representation generation subsystem 123 determines the intra-view reconstruction loss, in some instances, as follows:

$$\mathcal{L}_{rec} = \Sigma_m \| \bar{\mathcal{X}}_m - \mathcal{X}_m \|_2 \tag{9}$$

The intra-view reconstruction loss is utilized to train the model so that it is able to generate view-aligned representations 128 and view-specific representations 127 that can be transformed into reconstructed features 401R that approximate the original extracted features 401.

FIG. 5 depicts an illustration of a method 500 for indexing replacement templates 116 and for selecting a set of replacement templates 116 for use in generating previews 115, according to certain embodiments described herein. For illustrative purposes, FIG. 5 is described with reference to certain examples depicted in the figures. Other implementations, however, are possible. As illustrated in FIG. 5, the recommendation subsystem 123 accesses a template 114. For example, the template 114 is displayed in an illustrator application document of an illustrator application interface 113. The recommendation subsystem 121 performs one or more feature extraction processes 501 to generate the extracted features 401 for the template 114. In some instances, the recommendation subsystem 121 extracts the image data 505 of the template 114, manifest JavaScript Object Notation (JSON) data 510 of the template 114, and layout annotations 515 and then applies each of the feature extraction processes 501 to one or more of the data 505, 510, and 515.

The recommendation subsystem 121 applies one or more feature extraction processes 501 to data 505, 510, and/or 515 of the template 114 to generate extracted features 401. For example, the recommendation subsystem 121 applies an object feature extraction process to the image data 505 of the template to generate the object features 401A. In some instances the object feature extraction process comprises the steps described in subblock 320A of FIG. 3. The recommendation subsystem 121 applies a style feature extraction process to the image data 505 of the template to generate the style features 401B. In some instances the style feature extraction process comprises the steps described in subblock 320B of FIG. 3. The recommendation subsystem 121 applies a color feature extraction process to the image data 505 of the template to generate the color features 401C. In some instances the color feature extraction process comprises the steps described in subblock 320C of FIG. 3. The recommendation subsystem 121 applies a layout feature extraction process to the image data 505 of the template to generate the layout features 401D. In some instances the layout feature extraction process comprises the steps described in subblock 320D of FIG. 3. The recommendation subsystem 121 applies a text feature extraction process to the image data 505 of the template to generate the text features 401E. In some instances the text feature extraction process comprises the steps described in subblock 320E of FIG. 3. Further details about the feature extraction processes are described in FIG. 3 at block 320.

The recommendation subsystem 121 applies a set of view-aligned embedding networks 415 to the extracted features 401 of the template 114 to generate a set of view-aligned representations 128. For example, the representation generation subsystem 123 applies an object view-aligned network 415A to the extracted object features 401A to generate an object view-aligned representation 128A. The representation generation subsystem 123 applies a style view-aligned network 415B to the extracted style features 401B to generate a style view-aligned representation 128B. The representation generation subsystem 123 applies a color view-aligned network 415C to the extracted color features 401C to generate a color view-aligned representation 128C. The representation generation subsystem 123 applies a layout view-aligned network 415D to the extracted layout features 401D to generate a layout view-aligned representation 128D. The representation generation subsystem 123 applies a text view-aligned network 415E to the extracted text features 401E to generate a text view-aligned representation 128E. FIG. 4 provides further details about generating this set of view-aligned representations 128 (e.g., 128A, 128B, 128C, 128D, 128E).

As illustrated in FIG. 5, the recommendation subsystem 121 receives a feature selection 520 and generates a ranked set 530 of replacement templates 116 based on the feature selection 520. The feature selection, in some instances, is a selection of one of the extracted object, style, color, layout, or text features (501A, 501B, 501C, 501D, 501E). The recommendation subsystem 121 retrieves the generated view-aligned representation 128 associated with the feature selection 520. For example, the feature selection 520 is a selection of the extracted color features 401C and the recommendation subsystem 121 retrieves the color view-aligned representation 128C. The recommendation subsystem 121, in a template library matching 525 step, determines a set of replacement templates 116 (e.g., the example set of three replacement templates 116-1, 116-2, and 116-3) by comparing the color view-aligned representation 128C to corresponding color view-aligned representations of the replacement templates 116. For example, the set of replacement templates 116 includes a predefined number of the replacement templates 116 having view-aligned representations of a greatest similarity to the view-aligned representation 128 for the feature selected in the feature selection 520. In some instances, the recommendation subsystem 121 ranks the set of replacement templates 116 according to their determined similarity to the selected view-aligned representation 128 of the feature selection 520. In certain embodiments, the recommendation subsystem 121 displays the ranked set 530 of replacement templates 116 via the illustrator application interface 113. For example, the recommendation subsystem 121 displays preview 115 user interface objects in the illustrator application interface 113. For example, for a set of n replacement templates 116, the recommendation subsystem 121 displays n previews 115, one for each of the n replacement templates 116. In some instances, the recommendation subsystem 121, responsive to receiving a selection of a preview 115 user interface object, displays a replacement template 116 associated with the selected preview 115 interface object in the illustrator application interface 113 instead of the template 114. Further details about displaying previews associated with a set of recommended replacement templates 116 and displaying a replacement template 116 associated with a selected preview 115 are described herein in FIG. 2.

In the following Figures, 6A-6B, 7, and 8, previews 115 generated for replacement templates 116 retrieved using the methods described herein (e.g., methods described in FIG. 2 and FIG. 5) are compared against previews 115 generated for replacement templates 116 retrieved using conventional methods.

Figure 6A:
FIG. 6A illustrates an example displayed template, a set of recommended replacement templates having designs that are similar across a target feature to a query feature of the displayed template, compared against a set of recommended replacement templates generated using a conventional method.
Figure 6A:
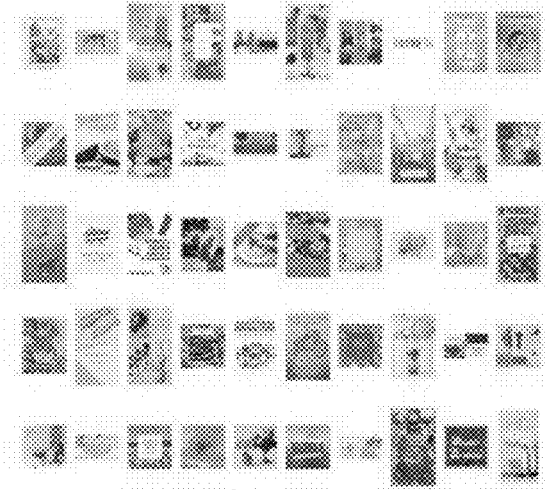
Figure 6A:
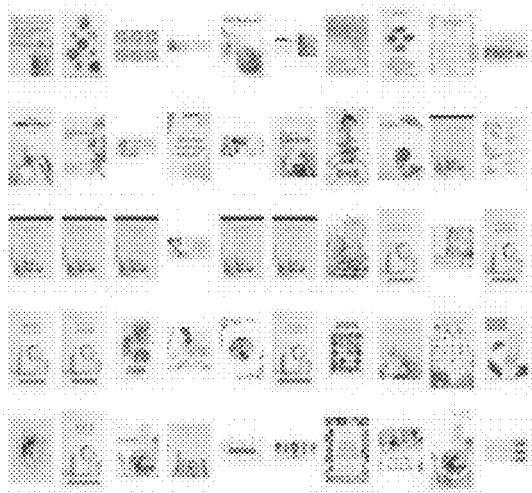

FIG. 6A illustrates an example displayed template 614, a set of recommended replacement templates 116 having designs that are similar across a target feature 117-2 to a query feature 117-1 of the displayed template 614, compared against a set of recommended replacement templates 116 generated using a conventional method, in accordance with certain embodiments described herein. For illustrative purposes, FIG. 6A is described with reference to certain examples depicted in the figures. Other implementations, however, are possible. that are similar across a color feature to a selected object feature of the displayed template 614. As depicted in FIG. 6A, previews 115 are displayed for the top fifty ranked replacement templates 116 for the template 614 having the text "hello, Spring!" based on query 117. Specifically, in the query 117 the query feature 117-1 is the "object" feature and the target feature 117-2 is the "color" feature. Accordingly, the query 117 specifies the request to retrieve replacement templates 116 that have color features/ schemes that go well with the object types in the displayed template 614. As also depicted in FIG. 6A, the top fifty previews 602 displayed for replacement templates 116 for the template 614 based on a conventional query 601, which only compares color features of the template 614 to color features of replacement templates 116. For example, the conventional query 601 compares a LAB histogram of the template 114 to LAB histograms of the replacement templates 116 to retrieve a set of most similar replacement templates 116 to generate the set of previews 602. When comparing the previews 115 to the previews 602, the previews 602 are all mostly white in color with shades of green, yellow, pink matching with the query template 614. However, the previews 115, which are generated for replacement templates 116 using the object view-aligned representation 128 from the query template 614 and color view-aligned representations 128 of the replacement templates 116 for similarity computation as per Equation (1) show a more diverse set of color shades not shown in the previews 602. For example, the previews 115 show brown, purple, red, orange along with darker greens, pinks, yellows.

Figure 6B:
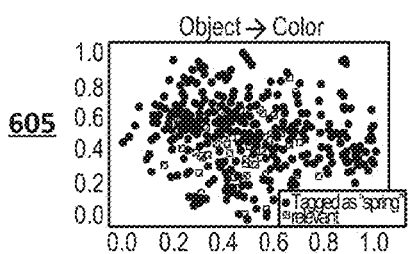
FIG. 6B depicts an illustration of T-distributed stochastic neighbor embedding (TSNE) distributions of the recommended replacement templates of FIG. 6A retrieved according to the embodiments herein and of conventionally retrieved replacement templates, in accordance with certain embodiments described herein.
Figure 6B:
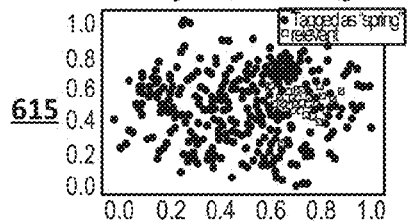
Figure 6B:
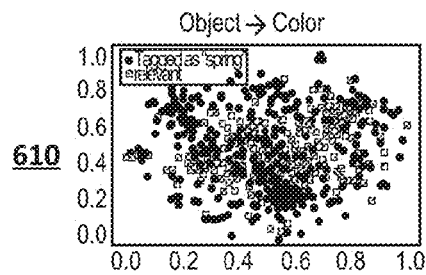
Figure 6B:
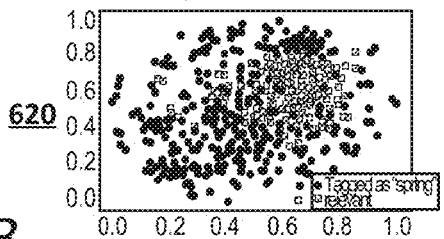

FIG. 6B depicts an illustration of T-distributed stochastic neighbor embedding (TSNE) distributions of the recommended replacement templates of FIG. 6A retrieved according to the embodiments herein and of conventionally retrieved replacement templates, in accordance with certain embodiments described herein. For illustrative purposes, FIG. 6B is described with reference to certain examples depicted in the figures. Other implementations, however, are possible. FIG. 6B shows TSNE plots 605, 610, 615, and 620 using the LAB Histograms (out-of-the-box color representations) for each replacement templates 116 plotted. The two left TSNE plots 605 and 610 plot the retrieved templates in the Object→Color query 117 described in FIG. 6A in red, along the templates (428 in this example) tagged as "spring" in the dataset in blue. The two axes represent two dimensions computed by a TSNE algorithm to visualize the data. For example, these two dimensions are learned using the TSNE algorithm, which projects a high number of dimensions (e.g. hundreds of dimensions) into a two-dimensional space while satisfying training objectives. Similarly, the two right-most TSNE plots 610 and 620 in FIG. 6B plot retrieved templates in the conventional LAB Histogram→LAB Histogram query 601 of FIG. 6A in red, with the same replacement templates 116 tagged "spring" in blue. In the top row of plots 605 and 610, the top-50 retrieved replacement templates 116 are plotted for each query 117 (in plot 605) and 602 (in plot 610), while in the bottom row TSNE plots 615 and 620, the top-200 retrieved replacement templates 116 are plotted for each query 117 (in plot 615) and 602 (in plot 620), to better compaßre with the larger tagged dataset size of 428. As shown, the plots 605 and 610 for the Object→Color query 117 of FIG. 6A have the retrieved (red) points scattered, somewhat covering the breadth and diversity of the dataset (blue) points. On the other hand, plots for the conventional LAB Histogram→LAB Histogram query 601 of FIG. 6A have the red points clustered in one area, which explains the observation of the same color theme in all the conventionally retrieved results in FIG. 6A. Therefore, the Object→Color query 117 retrieval of FIG. 6A better captures the diverse range of color themes exhibited in "spring"-tagged templates throughout the replacement template 116 database than the conventional query 601 of FIG. 6A.

Figure 7:
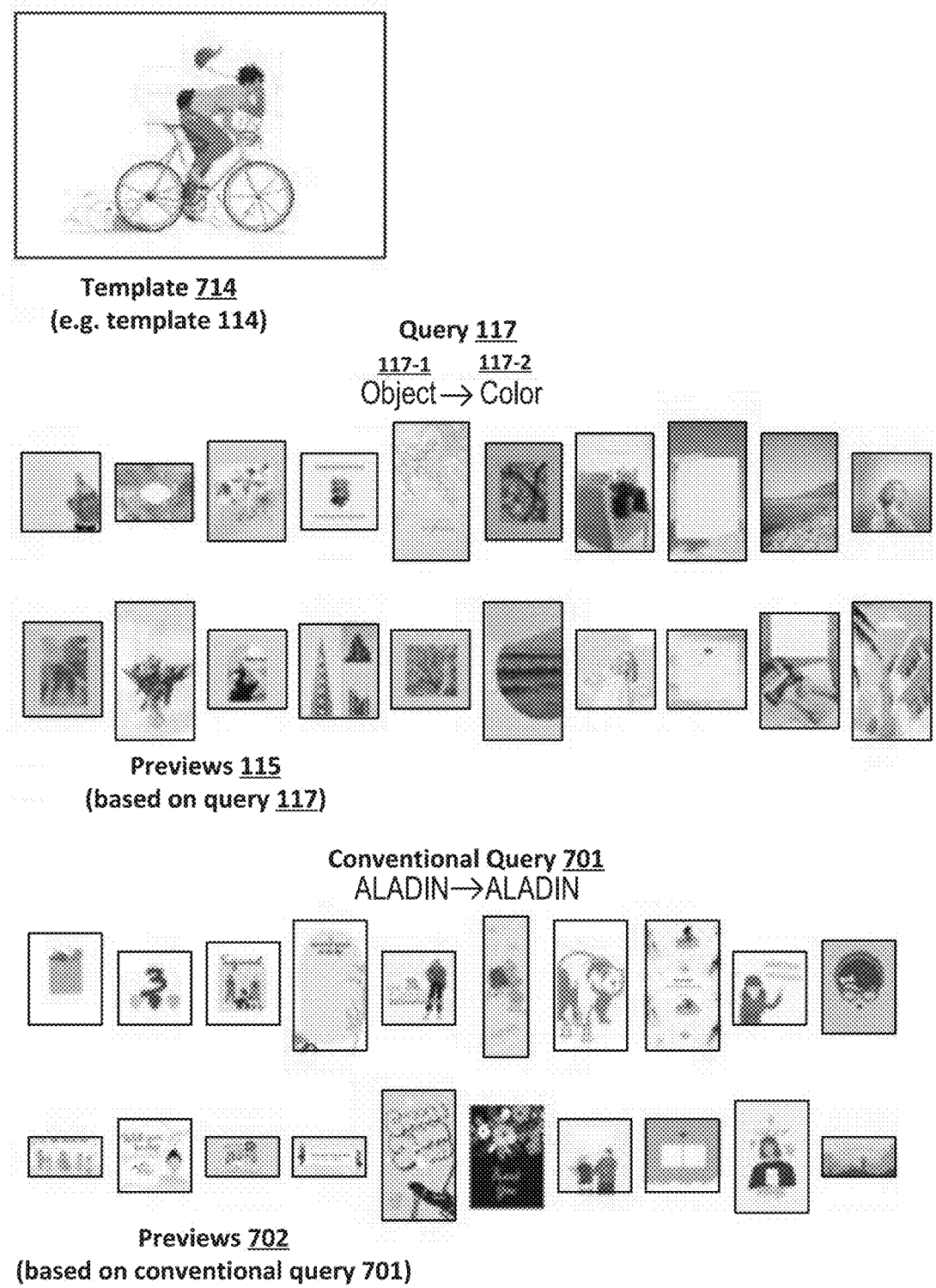
FIG. 7 illustrates an example displayed template, a set of recommended replacement templates having designs that are similar across a target feature to a query feature of the displayed template, compared against a set of recommended replacement templates generated using a conventional method.

FIG. 7 illustrates an example displayed template 714, a set of recommended replacement templates 116 having designs that are similar across a target feature 117-2 to a query feature 117-1 of the displayed template 114, compared against a set of recommended replacement templates generated using a conventional method, in accordance with certain embodiments described herein. As depicted in FIG. 7, previews 115 are displayed for the top twenty ranked replacement templates 116 for the template 714 having the image of a bicycle cartoon based on query 117. Specifically, in the query 117 the query feature 117-1 is the "object" feature and the target feature 117-2 is the "style" feature. Accordingly, the query 11317 specifies the request to retrieve replacement templates 116 that have style features/ schemes that go well with the object types in the displayed template 714. As also depicted in FIG. 7, the top fifty previews 702 displayed for replacement templates 116 for the template 714 based on a conventional query 701, which only compares style features of the template 714 to style features of replacement templates 116. For example, the conventional query 701 compares features extracted via an ALADIN network of the template 714 to ALADIN features of the replacement templates 116 to retrieve a set of most similar replacement templates 116 to generate the set of previews 702. When comparing the previews 115 to the previews 702, the previews 702 show strictly cartoon templates, which is a direct consequence of the ALADIN embeddings replicating the cartoon style information in the query template 714, without being able to separate the core content ("bicycle") from it. However, the previews 115, which are generated for replacement templates 116 using the object view-aligned representation 128 from the query template 714 and style view-aligned representations 128 of the replacement templates 116 for similarity computation as per Equation (1) show a more diverse set of stylistic variations associated with the object "bicycle," which are not shown in the previews 702. For example, the previews 115 show brown, purple, red, orange along with darker greens, pinks, yellows.

Examples of Computing Environments for Implementing Certain Embodiments

Figure 8:
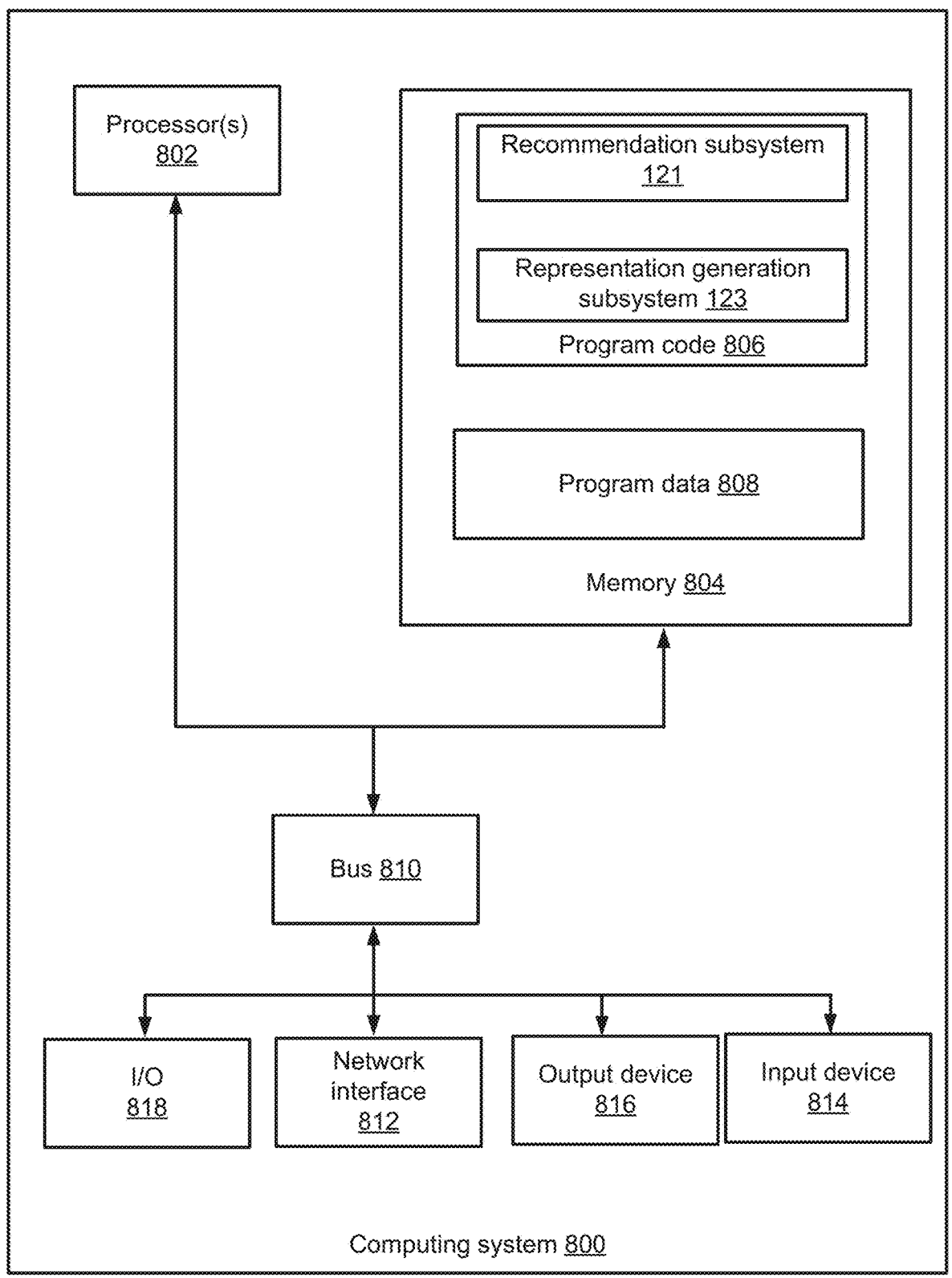
FIG. 8 depicts an example of a computing system that performs certain operations described herein, according to certain embodiments described in the present disclosure.

Any suitable computer system or group of computer systems can be used for performing the operations described herein. For example, FIG. 8 depicts an example of a computer system 800. The depicted example of the computer system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing program code 806, program data 808, or both. A computer-readable medium can include any electronic, optical, magnetic, or other storage device capable of providing a processor with computer-executable instructions or other program code. Non-limiting examples of a computer-executable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and Action-Script. In various examples, the memory device 704 can be volatile memory, non-volatile memory, or a combination thereof.

The computer system 800 executes program code 806 that configures the processor 802 to perform one or more of the operations described herein. Examples of the program code 806 include, in various embodiments, the recommendation subsystem 121 and the representation generation subsystem 123 of FIG. 1, which may include any other suitable systems or subsystems that perform one or more operations described herein (e.g., one or more neural networks, encoders, attention propagation subsystem and segmentation subsystem). The program code 806 may be resident in the memory device 804 or any suitable computer-readable medium and may be executed by the processor 802 or any other suitable processor.

The processor 802 is an integrated circuit device that can execute the program code 806. The program code 806 can be for executing an operating system, an application system or subsystem, or both. When executed by the processor 802, the instructions cause the processor 802 to perform operations of the program code 806. When being executed by the processor 802, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 804 store the program data 808 that includes one or more datasets described herein. In some embodiments, one or more of data sets are stored in the same memory device (e.g., one of the memory devices 804). In additional or alternative embodiments, one or more of the programs, data sets, models, and functions described herein are stored in different memory devices 804 accessible via a data network. One or more buses 810 are also included in the computer system 800. The buses 810 communicatively couple one or more components of a respective one of the computer system 800.

In some embodiments, the computer system 800 also includes a network interface device 812. The network interface device 812 includes any device or group of devices suitable for establishing a wired or wireless data connection to one or more data networks. Non-limiting examples of the network interface device 812 include an Ethernet network adapter, a modem, and/or the like. The computer system 800 is able to communicate with one or more other computing devices via a data network using the network interface device 812.

The computer system 800 may also include a number of external or internal devices, an input device 814, a presentation device 816, or other input or output devices. For example, the computer system 800 is shown with one or more input/output ("I/O") interfaces 818. An I/O interface 818 can receive input from input devices or provide output to output devices. An input device 814 can include any device or group of devices suitable for receiving visual, auditory, or other suitable input that controls or affects the operations of the processor 802. Non-limiting examples of the input device 814 include a touchscreen, a mouse, a keyboard, a microphone, a separate mobile computing device, etc. A presentation device 1116 can include any device or group of devices suitable for providing visual, auditory, or other suitable sensory output. Non-limiting examples of the presentation device 816 include a touchscreen, a monitor, a speaker, a separate mobile computing device, etc.

Although FIG. 8 depicts the input device 814 and the presentation device 816 as being local to the computer system 800, other implementations are possible. For instance, in some embodiments, one or more of the input device 814 and the presentation device 816 can include a remote client-computing device that communicates with computing system 800 via the network interface device 812 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 9:
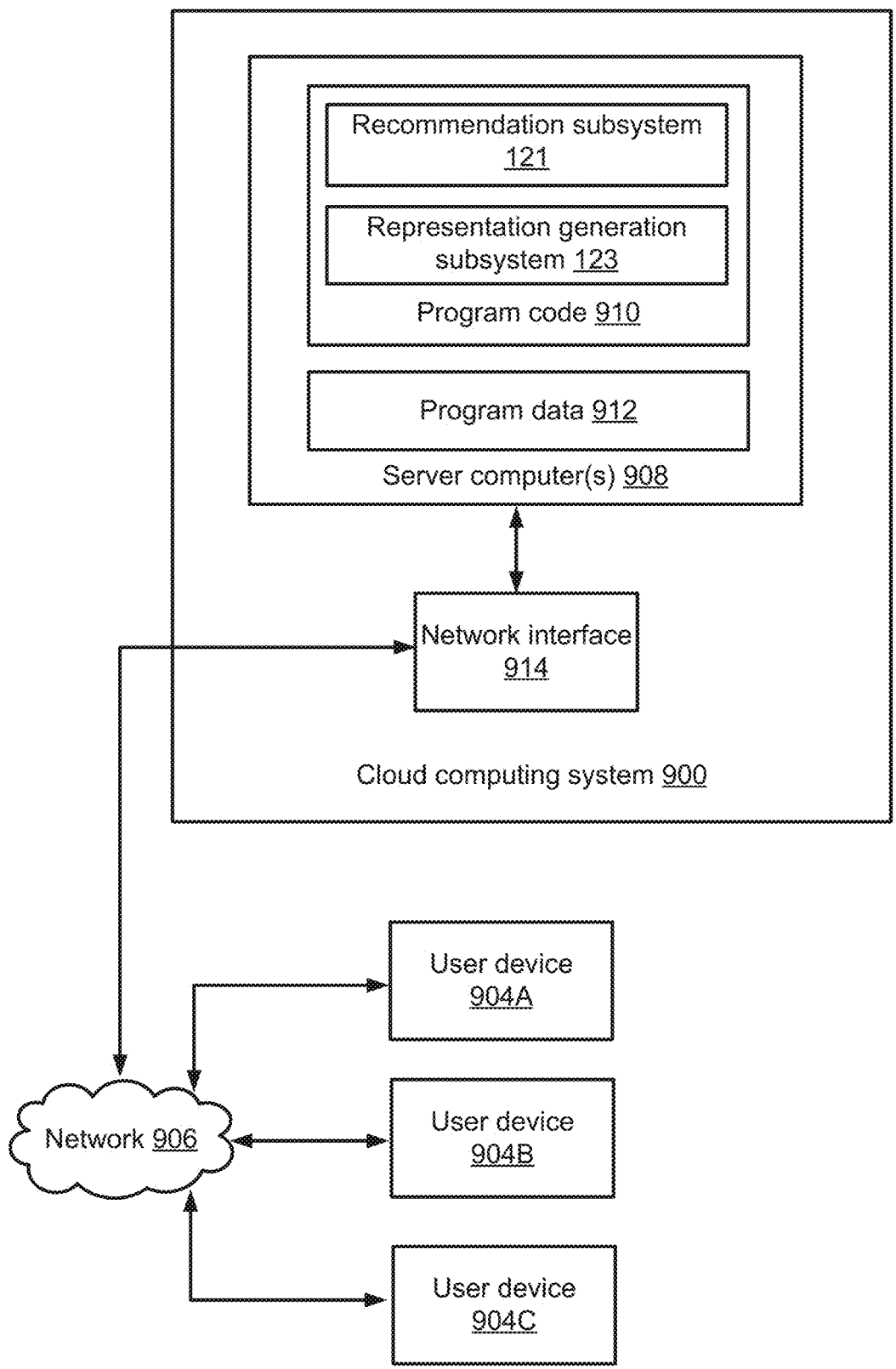
FIG. 9 an example of a cloud computing system that performs certain operations described herein, according to certain embodiments described in the present disclosure.

In some embodiments, the functionality provided by computer system 800 may be offered as cloud services by a cloud service provider. For example, FIG. 9 depicts an example of a cloud computer system 1200 offering a service for determining a set of replacement templates 116 to replace a displayed template 114 and a service for generating previews 115 of the replacement templates 116, that can be used by a number of user subscribers using user devices 904A, 904B, and 904C across a data network 906. In the example, the service for determining a set of replacement templates 116 to replace a displayed template 114 and a service for generating previews 115 of the replacement templates 116 may be offered under a Software as a Service (SaaS) model. One or more users may subscribe to the service for determining a set of replacement templates 116 to replace a displayed template 114 and a service for generating previews 115 of the replacement templates 116, and the cloud computer system 900 performs the processing to provide the service for determining a set of replacement templates 116 to replace a displayed template 114 and a service for generating previews 115 of the replacement templates 116 to subscribers. The cloud computer system 900 may include one or more remote server computers 908.

The remote server computers 908 include any suitable non-transitory computer-readable medium for storing program code 910 (e.g., the recommendation subsystem 121 and the representation subsystem 123 of FIG. 1) and program data 912, or both, which is used by the cloud computer system 900 for providing the cloud services. A computer-readable medium can include any electronic, optical, magnetic, or other storage device capable of providing a processor with computer-executable instructions or other program code. Non-limiting examples of a computer-executable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 908 can include volatile memory, non-volatile memory, or a combination thereof.

One or more of the server computers 908 execute the program code 910 that configures one or more processors of the server computers 908 to perform one or more of the operations that determine a set of replacement templates 116 to replace a displayed template 114 and that generate previews 115 of the replacement templates 116. As depicted in the embodiment in FIG. 9, the one or more servers providing the service for determining a set of replacement templates 116 to replace a displayed template 114 and a service for generating previews 115 of the replacement templates 116 may implement the recommendation subsystem 121 and the representation generation subsystem 123. Any other suitable systems or subsystems that perform one or more operations described herein (e.g., one or more development systems for configuring an interactive user interface) can also be implemented by the cloud computer system 900.

In certain embodiments, the cloud computer system 900 may implement the services by executing program code and/or using program data 912, which may be resident in a memory device of the server computers 908 or any suitable computer-readable medium and may be executed by the processors of the server computers 908 or any other suitable processor.

In some embodiments, the program data 912 includes one or more datasets and models described herein. In some embodiments, one or more of data sets, models, and functions are stored in the same memory device. In additional or alternative embodiments, one or more of the programs, data sets, models, and functions described herein are stored in different memory devices accessible via the data network 906.

The cloud computer system 900 also includes a network interface device 914 that enable communications to and from cloud computer system 900. In certain embodiments, the network interface device 914 includes any device or group of devices suitable for establishing a wired or wireless data connection to the data networks 906. Non-limiting examples of the network interface device 914 include an Ethernet network adapter, a modem, and/or the like. The service for determining a set of replacement templates 116 to replace a displayed template 114 and the service for generating previews 115 of the replacement templates 116 is able to communicate with the user devices 904A, 904B, and 904C via the data network 906 using the network interface device 1214.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method, comprising:
   determining, for each feature of a set of features, a feature representation for an electronic document displayed via a user interface, the electronic document comprising a plurality of elements, wherein the feature representation is determined based on the plurality of elements;
   receiving, via the user interface, a selection from among the set of features of (1) a query feature and of (2) a target feature;
   determining, for each replacement template of a set of replacement templates, a compatibility score based on a query feature representation comprising the feature representation for the electronic document determined for the query feature and a target feature representation of the replacement template determined for the target feature, wherein the query feature representation and the target feature representation are determined in a joint representation space;
   selecting one or more replacement electronic documents based on the determined compatibility scores; and
   displaying, via the user interface with the electronic document, a preview for each replacement electronic document of the one or more replacement electronic documents;
   responsive to receiving, via the user interface, a selection of a particular preview from the displayed one or more previews, displaying, via the user interface, a particular replacement electronic document associated with the selected particular preview instead of the electronic document.

2. The method of claim 1, wherein the electronic document comprises a template and wherein the set of features comprise object type features, color features, style features, layout features, and text features.

3. The method of claim 1, further comprising determining each feature of the set of features, wherein determining each feature comprises applying, to the plurality of elements, a respective machine learning model associated with the feature.

4. The method of claim 1, wherein the plurality of elements comprise one or more of a background element, text elements, image elements, video elements, audio elements, or shape elements.

5. The method of claim 1, wherein determining, for each feature of a set of features, the respective feature representation comprises:

applying, to the plurality of elements of the electronic document, a respective representation generation network associated with the feature to generate the respective feature representation.

6. The method of claim 1, wherein determining the compatibility score for each replacement template of a set of replacement templates comprises finding a product of the query feature representation and the respective target feature representation for the replacement template.

7. The method of claim 1, wherein the selected one or more replacement electronic documents comprise a predefined number of replacement electronic documents having highest compatibility scores.

8. A non-transitory computer-readable medium storing executable instructions, which when executed by a processing device, cause the processing device to perform operations comprising:

determining, for each feature of a set of features, a feature representation for an electronic document displayed via a user interface, the electronic document comprising a plurality of elements, wherein the feature representation is determined based on the plurality of elements;

receiving, via the user interface, a selection from among the set of features of (1) a query feature and of (2) a target feature;

selecting one or more replacement electronic documents based on comparing a query feature representation comprising the feature representation for the electronic document determined for the query feature to a target feature representation of the replacement template determined for the target feature; and displaying, via the user interface with the electronic document, a preview for each replacement electronic document of the one or more replacement electronic documents;

responsive to receiving, via the user interface, a selection of a particular preview from the displayed one or more previews, displaying, via the user interface, a particular replacement electronic document associated with the selected particular preview instead of the electronic document.

9. The non-transitory computer-readable medium of claim 8, wherein the query feature representation and the target feature representation are determined in a joint representation space.

10. The non-transitory computer-readable medium of claim 8, wherein selecting the one or more replacement templates comprises:

determining, for each replacement template of a set of replacement templates, a compatibility score by determining a product of the query feature representation and the target feature representation, wherein the selected the one or more replacement electronic documents comprise a predefined number of replacement templates having highest determined compatibility scores.

11. The non-transitory computer-readable medium of claim 8, wherein the set of features comprise object type features, color features, style features, layout features, and text features.

12. The non-transitory computer-readable medium of claim 8, the operations further comprising determining each feature of the set of features, wherein determining each feature comprises applying, to the plurality of elements, a respective machine learning model associated with the feature.

13. The non-transitory computer-readable medium of claim 8, wherein the plurality of elements comprise one or more of a background element, text elements, image elements, video elements, audio elements, or shape elements.

14. The non-transitory computer-readable medium of claim 8, wherein determining, for each feature of a set of features, the respective feature representation comprises:

applying, to the plurality of elements of the electronic document, a respective representation generation network associated with the feature to generate the respective feature representation.

15. A system comprising:

a memory component; and a processing device coupled to the memory component, the processing device to perform operations comprising:

extracting, for a replacement electronic document, a set of features;

applying, for each feature of the set of features and to the plurality of elements of the replacement electronic document:

a respective view specific representation generation network to generate a respective view specific representation for the feature, wherein the view specific representations are generated to minimize an overlap between the view specific representations; and a respective view aligned representation generation network to generate a respective view aligned representation for the feature, wherein the view aligned representations are generated in a joint representation space;

applying, to the view specific representations and the view aligned representations, a reconstruction network to generate a set of reconstructed features;

modifying at least one parameter of the view aligned representation network based on the set of features and the set of reconstructed features.

16. The system of claim 15, wherein the reconstruction network determines the set of reconstructed features by at least concatenating the view aligned representations and the view specific representations for each feature of the set of features.

17. The system of claim 15, wherein the view specific representations minimize the overlap between view specific representations by using an orthogonality constraint.

18. The system of claim 15, wherein the set of features comprise object type features, color features, style features, layout features, and text features.

* * * * *